(12) United States Patent
Allen et al.

(10) Patent No.: US 7,614,283 B2
(45) Date of Patent: Nov. 10, 2009

(54) COOLING SYSTEM TESTING APPARATUS AND METHODS

(75) Inventors: David Mark Allen, St. Louis, MO (US); Eric Daniel Krassinger, Brentwood, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 743 days.

(21) Appl. No.: 11/405,113

(22) Filed: Apr. 17, 2006

(65) Prior Publication Data
US 2007/0240434 A1 Oct. 18, 2007

(51) Int. Cl.
*G01M 3/26* (2006.01)
(52) U.S. Cl. ............................................. 73/49.7
(58) Field of Classification Search ............... 73/49.7; 137/552, 557
See application file for complete search history.

(56) References Cited

U.S. PATENT DOCUMENTS

| | | | |
|---|---|---|---|
| 3,255,631 A * | 6/1966 | Franks | 374/143 |
| 4,149,574 A | 4/1979 | Lehmann et al. | |
| 4,235,100 A | 11/1980 | Branchini | |
| 4,378,034 A | 3/1983 | Albertson | |
| 4,442,702 A | 4/1984 | Sawada | |
| 4,494,402 A | 1/1985 | Carney | |
| 4,574,620 A * | 3/1986 | Cohl | 73/47 |
| 4,667,507 A * | 5/1987 | Eriksson | 73/49.7 |
| 4,782,689 A | 11/1988 | DeRome | |
| 4,800,931 A | 1/1989 | Petkovsek | |
| 4,888,980 A | 12/1989 | DeRome | |
| 4,901,786 A | 2/1990 | Vataru et al. | |
| 4,993,256 A | 2/1991 | Fukuda | |
| 4,996,874 A | 3/1991 | Colomer et al. | |
| 5,069,062 A | 12/1991 | Malecek et al. | |
| 5,105,653 A | 4/1992 | Konter | |
| 5,193,381 A | 3/1993 | Heimann | |
| 5,201,213 A | 4/1993 | Henning | |
| 5,242,273 A | 9/1993 | Payne | |
| 5,295,747 A * | 3/1994 | Vinci | 374/208 |
| 5,324,114 A | 6/1994 | Vinci | |
| 5,329,982 A | 7/1994 | Payne | |
| 5,372,031 A | 12/1994 | Harmand | |
| 5,425,333 A | 6/1995 | Baylor et al. | |
| 5,557,966 A | 9/1996 | Corry | |

(Continued)

FOREIGN PATENT DOCUMENTS

DE 19643779 A1 10/1995

(Continued)

OTHER PUBLICATIONS

MityVac 04520 Universal Cooling System Pressure Test Kit; online catalog at http://www.mityvac.com/pages/ products_cse.asp; admitted as prior art; 1 page.

(Continued)

*Primary Examiner*—John Fitzgerald
(74) *Attorney, Agent, or Firm*—Senniger Powers LLP

(57) ABSTRACT

This invention describes apparatus for and methods of testing cooling systems. The apparatus and method can be used for, among other things, pressurizing the cooling system either to a positive pressure or to a negative pressure, and for conducting temperature tests.

17 Claims, 19 Drawing Sheets

U.S. PATENT DOCUMENTS

| | | | |
|---|---|---|---|
| 5,615,716 A | 4/1997 | Akazawa | |
| 5,649,574 A | 7/1997 | Turcotte et al. | |
| 5,705,737 A | 1/1998 | Liao | |
| 5,760,296 A | 6/1998 | Wilson | |
| 5,767,389 A | 6/1998 | LaFountain | |
| 6,135,067 A | 10/2000 | Klamm et al. | |
| 6,135,136 A | 10/2000 | Klamm | |
| 6,152,193 A | 11/2000 | Klamm | |
| 6,161,566 A | 12/2000 | Klamm | |
| RE37,151 E | 5/2001 | LaFountain | |
| 6,234,215 B1 | 5/2001 | Klamm | |
| 6,318,155 B1 | 11/2001 | Carr | |
| 6,345,958 B1 | 2/2002 | Chen | |
| 6,360,790 B1 | 3/2002 | Klamm et al. | |
| 6,523,580 B1 | 2/2003 | Awad | |
| 6,584,994 B2 | 7/2003 | Knowles et al. | |
| 6,588,445 B2 | 7/2003 | Knowles et al. | |
| 6,604,557 B2 | 8/2003 | Awad | |
| 6,612,327 B2 | 9/2003 | Knowles et al. | |
| 6,644,124 B2 | 11/2003 | Huang | |
| 6,675,829 B2 | 1/2004 | Moore, Jr. | |
| 6,681,812 B2 | 1/2004 | Mitchell | |
| 6,742,535 B1 | 6/2004 | Knowles et al. | |
| 6,782,926 B1 | 8/2004 | Hughes | |
| 6,883,533 B2 | 4/2005 | Knowles et al. | |
| 6,951,222 B2 | 10/2005 | Liao | |
| 6,959,717 B2 | 11/2005 | Knowles et al. | |
| 2005/0205119 A1 | 9/2005 | Awad | |

FOREIGN PATENT DOCUMENTS

WO   WO 9905497 A1   2/1999

OTHER PUBLICATIONS

U-View 550500 Vacuum Test Kit; online catalog at http://www.uviewcom/homepage.html; undated; admitted as prior art; 1 page.

KD Tools 3700 Pressure Test Kit; online catalog at www.kd-tools.com/PDF/KDSuppCat03.pdf; undated; admitted as prior art; 1 page.

Astro Pneumatic 7858 Pressure Test Kit; online catalog at http://www.astrotools.com; undated; admitted as prior art; 1 page.

Waekon CSA 11 Pressure Test Kit; online catalog at http://www.waekon.com/ps/catalog/cs02.html; undated; admitted as prior art; 1 page.

Waekon CSA 01 Pressure Test Kit; online catalog at http://www.waekon.com/PS/catalog/cs04.html; undated; admitted as prior art; 1 page.

U-View 590000 Vacuum Pressure Combo Test Kit; online catalog at http://www.uview.com/homepage.html; undated; admitted as prior art; 1 page.

* cited by examiner (TEMPERATURE TEST)

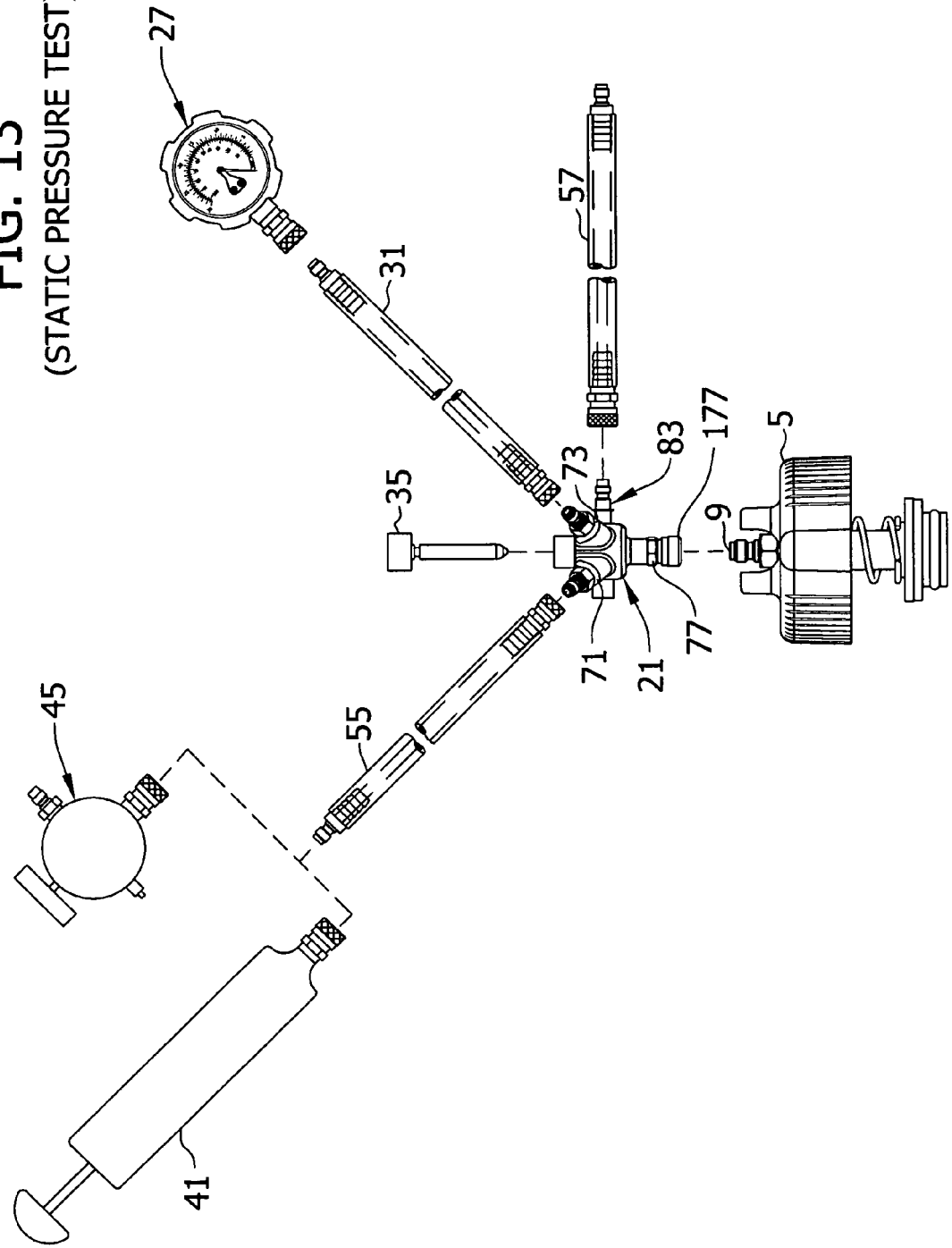
FIG. 13 (STATIC PRESSURE TEST)

(DYNAMIC PRESSURE TEST)

(DYNAMIC PRESSURE/TEMPERATURE TEST)

(CAP PRESSURE TEST)

(VACUUM TEST)

(SYSTEM FILL/AIRLOCK ELIMINATION TEST)

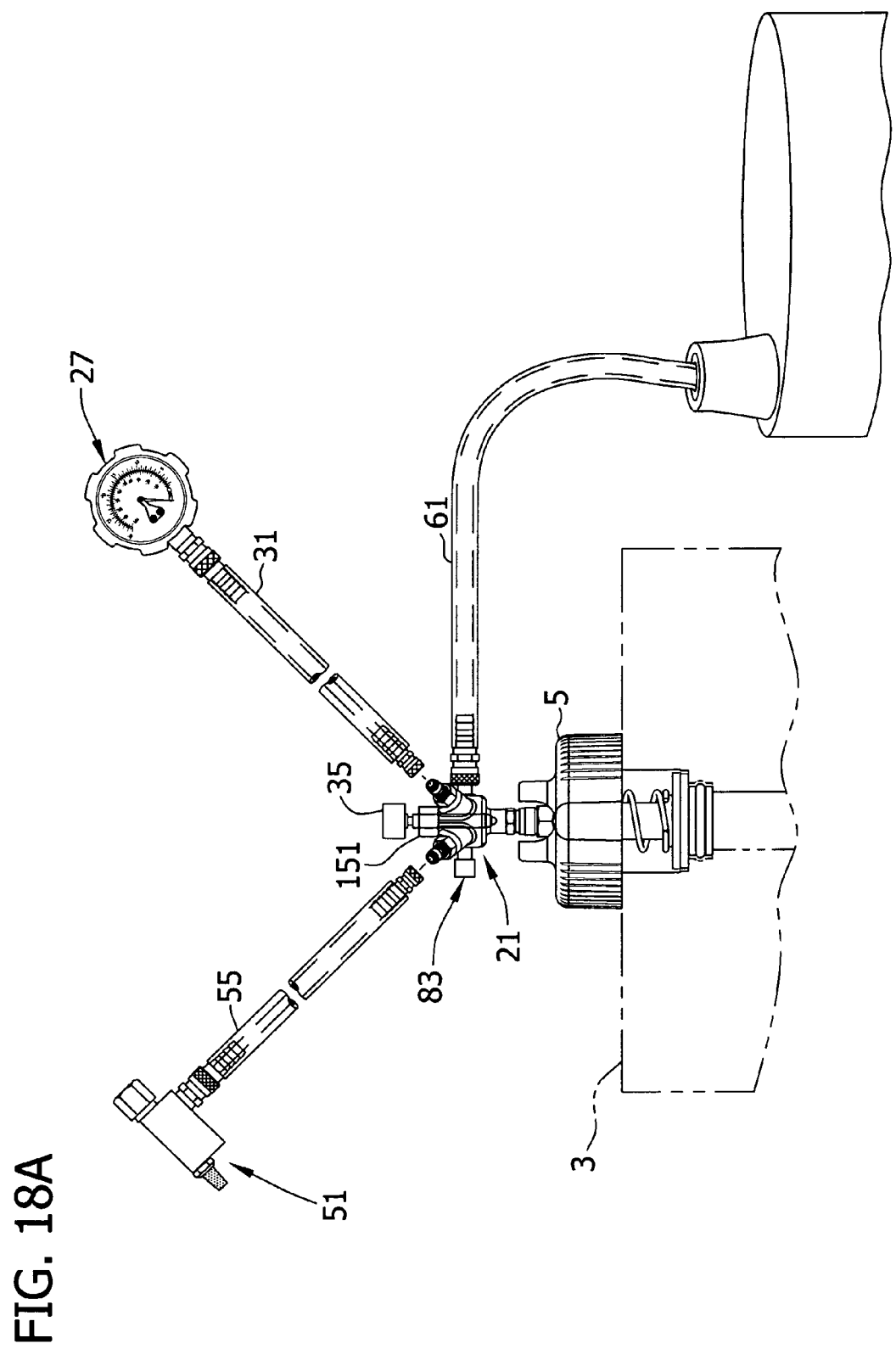

COOLING SYSTEM TESTING APPARATUS AND METHODS

BACKGROUND OF THE INVENTION

This invention relates generally to apparatus and methods for testing cooling systems, and particularly engine cooling systems.

Cooling systems must be checked from time to time for leaks and proper functioning. Conventional testing equipment typically falls into two categories, namely, pressure kits and vacuum kits. Pressure kits are used to pressurize a cooling system to some pressure greater than atmospheric pressure (e.g., 15 psig), following which the pressure is monitored to see if it drops, indicating a leak of fluid (liquid or air). Leaks are generally easy to locate using this type of kit, but refilling the system with liquid after it has been repaired may cause air bubbles. Vacuum kits are used to de-pressurize a cooling system (i.e., reduce system pressure to below ambient pressure, or vacuum), following which the pressure is monitored to see if it increases, indicating a leak of fluid (liquid or air). Leaks are harder to find using this method, but refilling after repair is much easier, since the vacuum can be used to refill the system without introducing air bubbles. Depending on the situation, it is sometimes more desirable to use the pressure method and sometimes more desirable to use the vacuum method.

There is a need, therefore, for a pressure testing system which can be used in either a positive pressure mode or a negative pressure (vacuum) mode, as the situation requires.

SUMMARY OF THE INVENTION

Among the several objects of this invention may be noted the provision of improved apparatus for and methods of testing cooling systems; the provision of such apparatus which, in at least some embodiments, can be used for both positive and negative pressure testing for fluid leakage; the provision of such apparatus which, in at least some embodiments, can be used for temperature testing; the provision of such apparatus which, in at least some embodiments, can be used for pressure testing radiator caps and radiator bottle caps; the provision of such apparatus which, in at least some embodiments, can be used for safely relieving the pressure in the cooling system after a test has been conducted; the provision of such apparatus which, in at least some embodiments, can be used to refill the cooling system after a negative pressure test has been conducted; and the provision of such apparatus which can be used to carry out one or more testing procedures and methods of the type described above.

In general, apparatus of the present invention is used for testing a cooling system. The apparatus comprises a valve body adapted for releasable connection to the cooling system. The valve body has a first port adapted for selective releasable connection to a source of positive pressure for pressurizing the cooling system and to a source of negative pressure for de-pressurizing the cooling system. A second port is provided on the valve body for connection to a pressure sensor for monitoring the pressure of fluid in the cooling system. The valve body has an outlet in fluid communication with the first and second ports and adapted for fluid communication with the cooling system when the valve body is connected to the cooling system. A valve member is movable in a valve passage in the valve body between open and closed positions. A flow passage is associated with the valve member such that when the valve member is in its open position the flow passage and the outlet are in fluid communication to permit fluid flow to or from the cooling system via the flow passage and the outlet, and when the valve member is its closed position the flow passage and the outlet are not in fluid communication to block said fluid flow.

In another aspect, pressure testing apparatus of this invention comprises a valve body adapted for releasable connection to a cooling system, a pressure sensor port on the valve body, and a pressure sensor adapted for connection to the pressure sensor port for monitoring the pressure of fluid in the cooling system. The valve body has an outlet in fluid communication with the pressure sensor port and adapted for fluid communication with the cooling system when the valve body is connected to the cooling system. A valve member is movable in a valve passage in the valve member between open and closed positions. A flow passage is associated with the valve member such that when the valve member is in its open position the flow passage and the outlet are in fluid communication to permit fluid flow to or from the cooling system via the flow passage and the outlet, and when the valve member is its closed position the flow passage and the outlet are not in fluid communication to block said fluid flow.

The present invention is also directed to a method of testing a cooling system for fluid leakage. The method comprises the steps of connecting a valve body to a cooling system adapter on the cooling system, and connecting a source of non-ambient pressure to the valve body to establish a flow path through the valve body and the cooling system adapter to the cooling system thereby to pressurize or de-pressurize the cooling system to a non-ambient pressure. The non-ambient pressure of the cooling system is monitored for pressure changes indicative of fluid leakage. While the valve body is connected to the cooling system adapter, a valve member in the valve body is moved to an open position establishing a flow path through the cooling system adapter and valve body to atmosphere.

In another respect, a method of this invention involves conducting a temperature test on a cooling system for an engine. The method comprises the steps of connecting a valve body to a cooling system adapter on the cooling system, inserting a temperature probe into a port in the valve body, and moving the probe through the valve body and the cooling system adapter to a position in which the probe contacts coolant in the cooling system. The temperature of the coolant is then monitored while the engine is operating. The method further comprises moving a valve member on the valve body to an open position establishing a flow path through the cooling system adapter and valve body to atmosphere to relieve pressure in the cooling system.

Other objects and features will be in part apparent and in part pointed out hereinafter.

BRIEF DESCRIPTION OF THE DRAWINGS

FIG. 13 is a view illustrating apparatus of this invention for conducting a static pressure test;

FIG. 18A is a view similar to FIG. 18 showing one embodiment of a refill step of the system fill/airlock elimination test.

Corresponding parts are indicated by corresponding reference numbers throughout the several views of the drawings.

DETAILED DESCRIPTION

Figure 1:
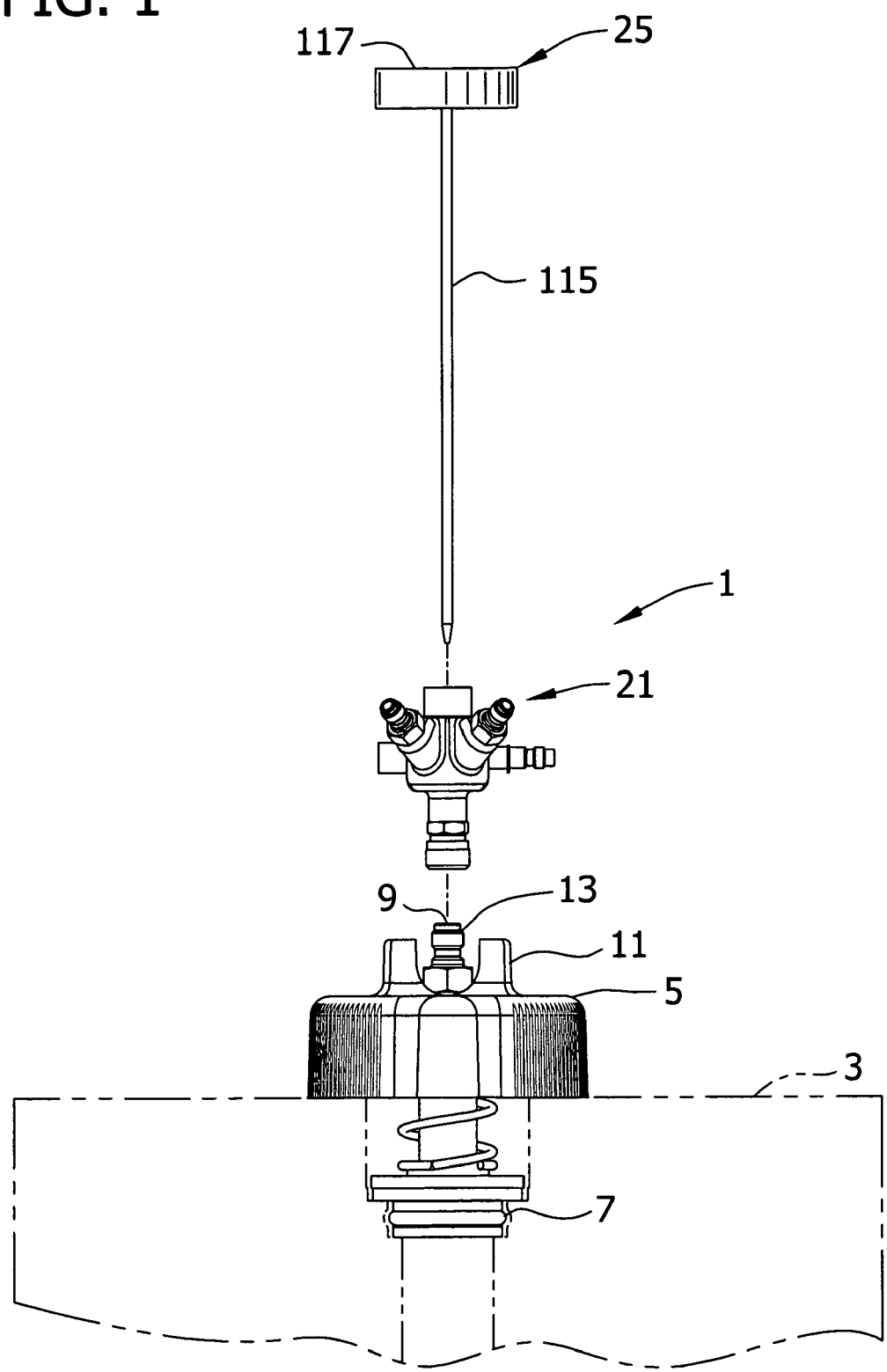
FIG. 1 is a view showing one embodiment of apparatus of this invention for conducting a test on a cooling system (shown in phantom)

Referring now to the drawings, FIG. 1 shows one embodiment of a testing apparatus of this invention, designated in its entirety by the reference numeral 1. In general, the apparatus is used for testing cooling systems, one such cooling system being shown schematically at 3 in FIG. 1. The testing apparatus 1 is connected to the cooling system 3 by means of a cooling system adapter 5 configured for releasable connection to a component of the cooling system, such as the inlet of a radiator or coolant refill bottle. The cooling system adapter 5 has an outlet (lower) end 7 and an inlet (upper) end 9 provided with a quick-connect fitting 13 to which the apparatus 1 connects, as will be described. There are two basic types of cooling system adapters, one having a lower end which is configured for making a bayonet (twist-lock) connection with the mouth of a radiator of the cooling system, and another having a threaded lower end for making a threaded connection with a coolant bottle of the cooling system. Adapters in each category have configurations which vary from vehicle to vehicle. The cooling system adapter 5 shown in the Figures of this description is intended to represent either type of cooling system adapter, or other types of adapters which may be used, such as a "universal" adapter for fitting radiators regardless of inlet size. (See, for example, U.S. Pat. No. 6,675,829, owned by Lincoln Industrial Corporation of St. Louis, Mo.)

In general, the apparatus 1 comprises a ported valve body, generally designated 21, adapted for releasable connection to the cooling system 3 (e.g., via the cooling system adapter 5) and to one or more test components which can be used in various combinations to perform different test procedures.

Figure 2:
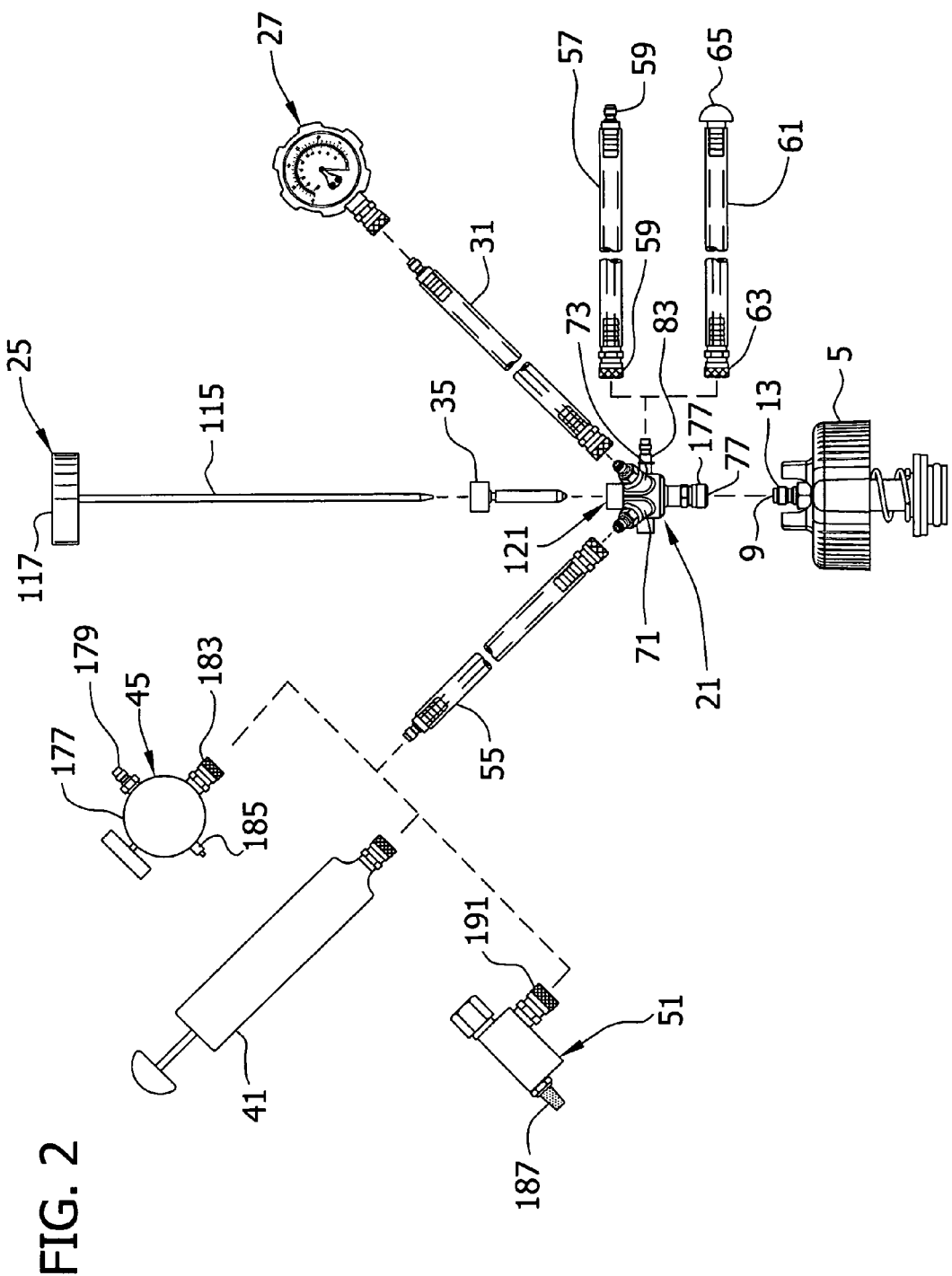
FIG. 2 is an exploded view showing a valve body of the apparatus of FIG. 1 and various test components which can be removably connected to the valve body for the purpose of conducting various test procedures on a cooling system.
Figure 3:
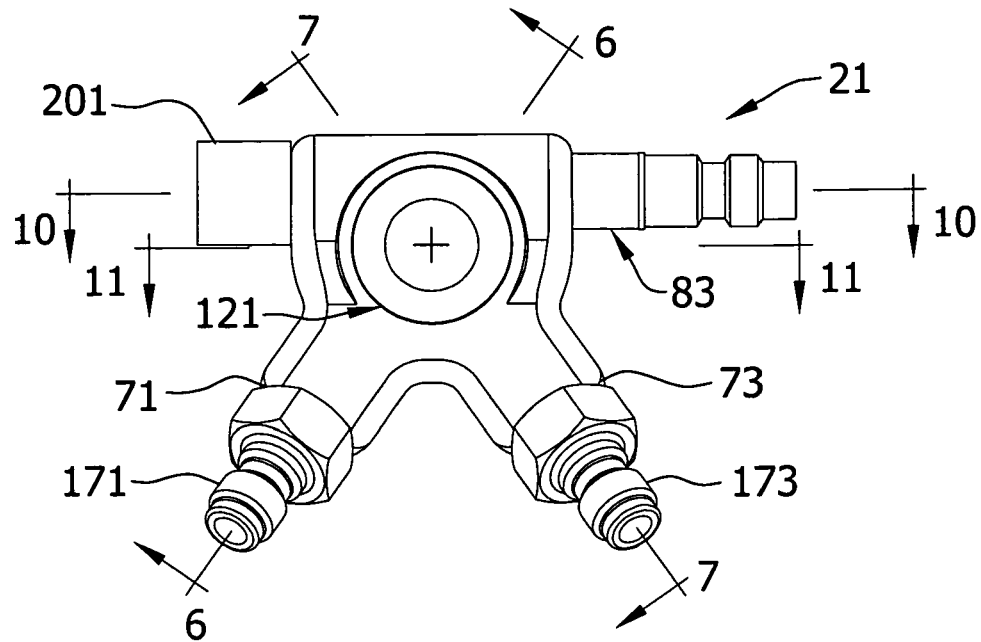
FIG. 3 is a top plan view of the valve body of FIG. 2.
Figure 4:
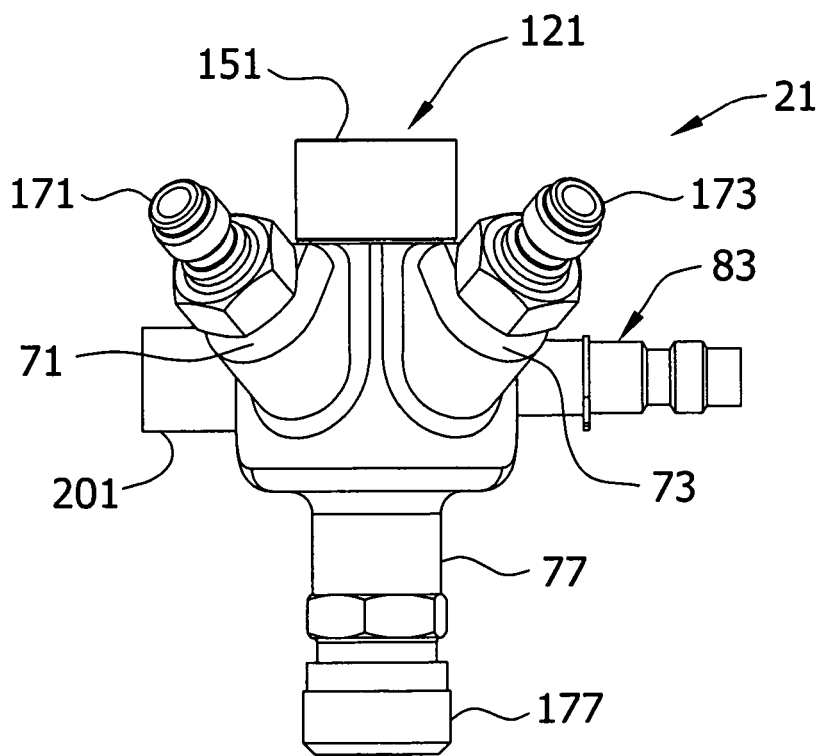
FIGS. 4 and 5 are side elevations of the valve body.
Figure 5:
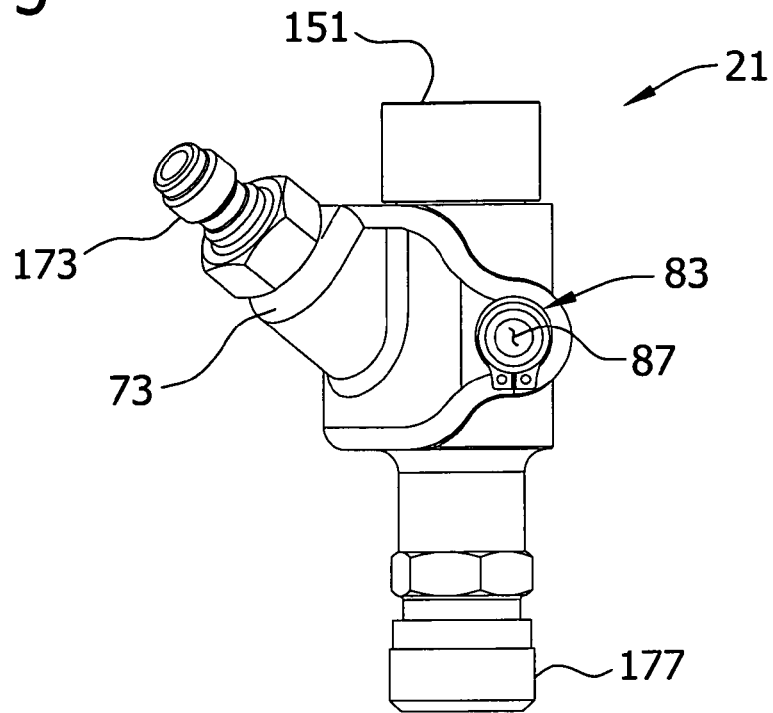

FIG. 2 shows a variety of such components, including: a temperature sensor 25; a pressure sensor 27; an extension hose 31 which may be used, if necessary or desirable for connecting the pressure sensor to the valve body 21; a plug 35 adapted to be connected to the valve body 21 when the temperature sensor 25 is not in use; a hand pump 41 for supplying air or gas under positive pressure (i.e., above ambient pressure); an adapter 45 for connection to a supply of air or gas under positive pressure (e.g., shop air); a device 51 for generating a negative pressure (i.e., below ambient pressure), such as a venturi device; an extension hose 55 which may be used, if necessary or desirable, to selectively connect the hand pump 41 to the valve body 21, or the adapter 45 to the valve body, or the negative-pressure device 51 to the valve body; an extension hose 57 having quick-connect fittings 59 at both ends for use when venting or releasing pressure from the cooling system 3; and an extension hose 61 having a quick connect fitting 63 at one end and a filter 65 at its opposite end for use when refilling the cooling system 3. The use of these various components to conduct various test procedures will be described in detail later.

Figure 6:
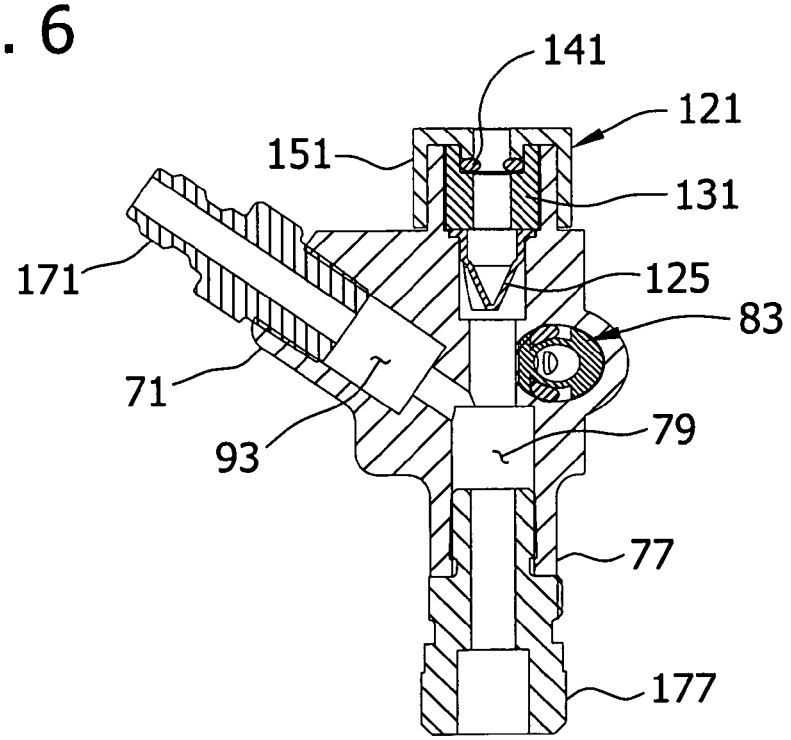
FIG. 6 is a sectional view taken on line 6-6 of FIG. 3.
Figure 6A:
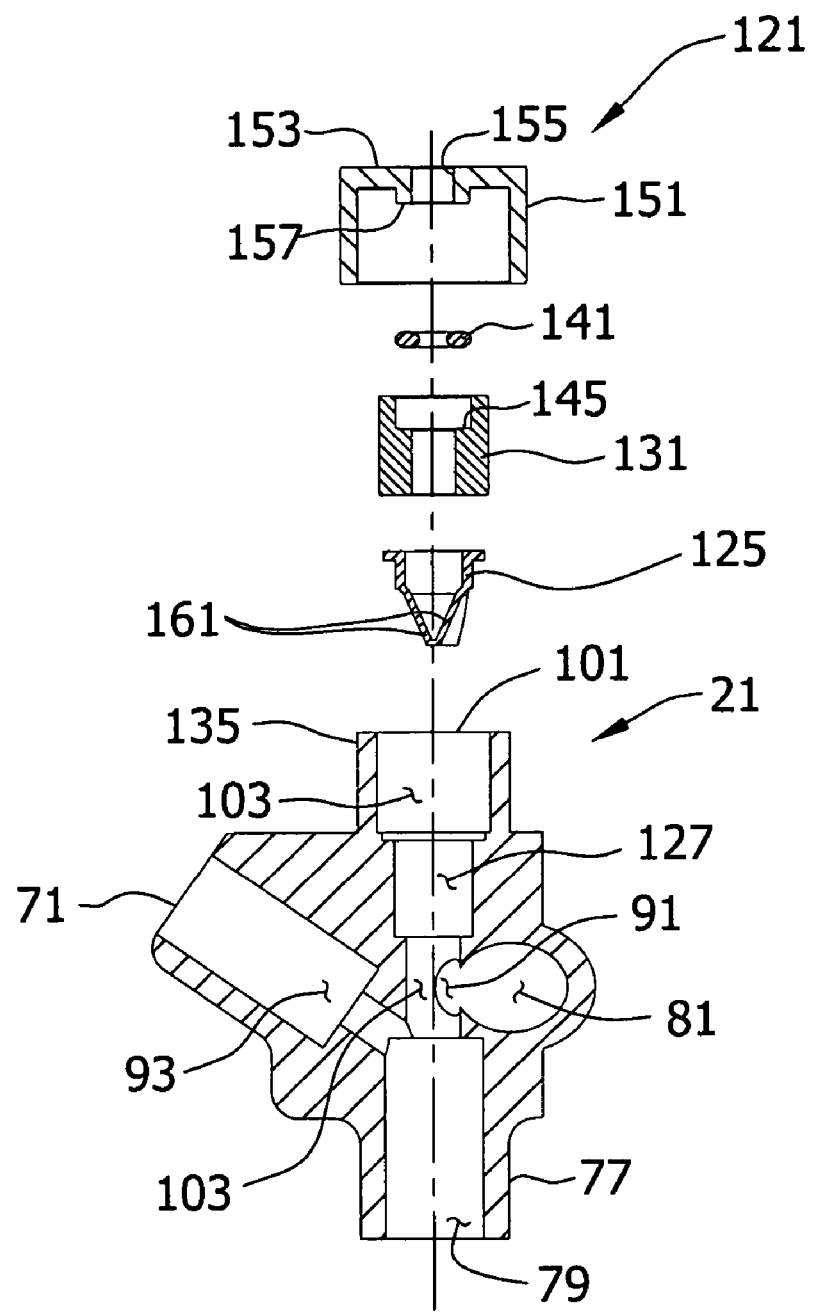
FIG. 6A is a view similar to FIG. 6 but with certain parts removed from the valve body and with parts of a sealing assembly shown exploded away from the valve body.

Referring to FIGS. 3-10, the valve body comprises first and second ports 71, 73 for connection to appropriate test components. The first port 71 is adapted for releasable connection to a source of positive pressure for pressurizing the cooling system 3 to a pressure below ambient pressure, such as the hand pump 41 or shop-air adapter 45 identified above. The first port 71 is also adapted for releasable connection to a source of negative (vacuum) pressure for de-pressurizing the cooling system 3 to a pressure below ambient pressure, such as the venturi device 51 identified above. The second port 73 is adapted for releasable connection to the pressure sensor 27 for monitoring the pressure of fluid in the cooling system 3. For example, the pressure sensor can be a compound pressure gauge having a digital or analog display for sensing both positive and negative pressures. The valve body has an outlet 77 comprising an outlet passage 79 (see FIGS. 6 and 7) in fluid communication with the first (pressure source) port 71 and the second (pressure sensor) port 73. The outlet passage 79 is adapted for fluid communication with the cooling system 3, via the cooling system adapter 5. As shown in FIGS. 6 and 6A, the valve body 21 also includes a valve passage 81 in the valve body 21, a valve member, generally designated 83, movable in the valve passage, and a flow passage 87 in the valve member (see FIGS. 8-10). The valve member 83 is movable in the valve passage 81 between a first open position (FIG. 10) in which the flow passage 87 and the outlet passage 79 of the valve body are in fluid communication to permit fluid flow to or from the cooling system via the flow and outlet passage, and a second closed position (FIG. 10A) in which the flow passage 87 and outlet passage 79 are not in fluid communication to block any such fluid flow.

Figure 7:
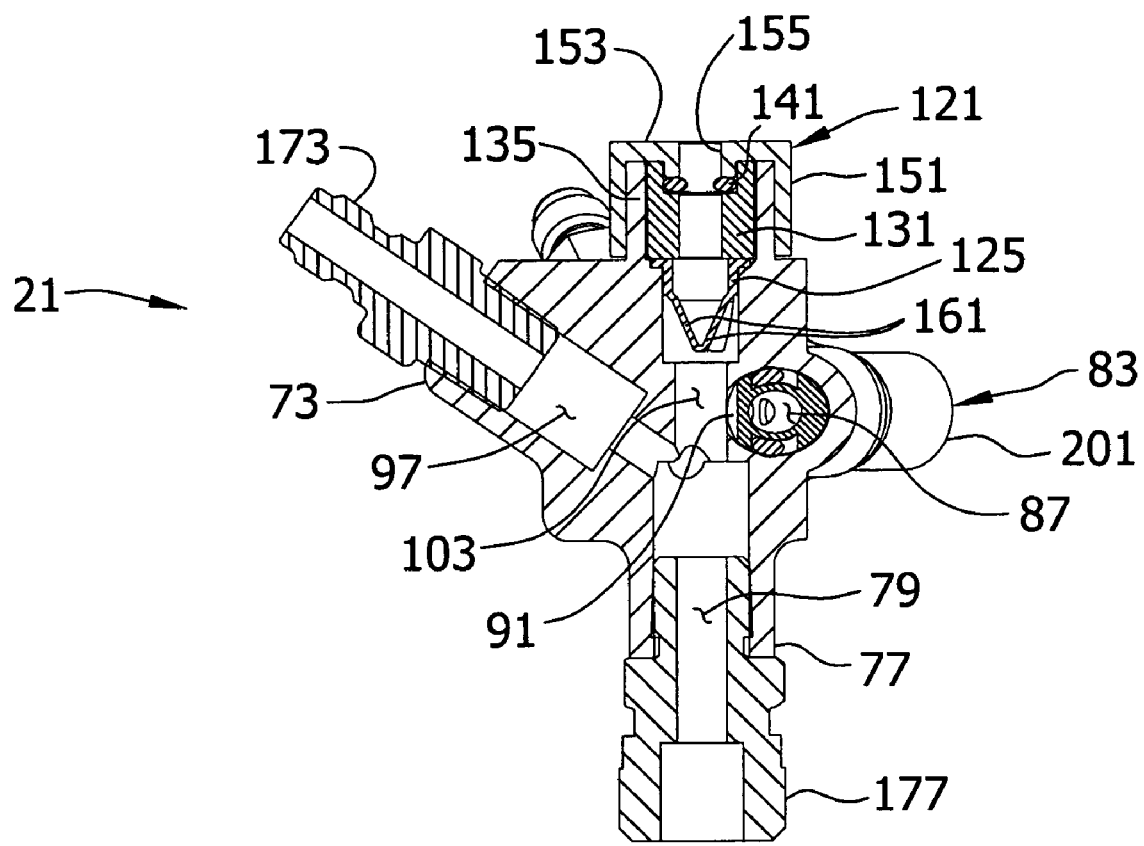
FIG. 7 is a sectional view taken on line 7-7 of FIG. 3.

The valve body 21 is preferably (but not necessarily) of unitary construction. For example, the valve body may be a molded part of suitable material (e.g., polypropylene sulfide). As shown in FIGS. 6, 6A and 7, the valve body 21 has a number of passages in it, including the outlet passage 79 and the valve passage 81 which are in fluid communication via an opening 91 (see FIG. 6A). The valve body 21 also includes a first passage 93 from the first port 71 communicating with the outlet passage 79, and a second passage 97 (FIG. 7) from the second port 73 communicating with the outlet passage 79.

In the illustrated embodiment, the valve body has a third port 101 and a third passage 103 from the third port communicating with the outlet passage 79 (FIG. 6A). This third port 101 may be used for receiving the temperature sensor 25 for sensing the temperature of fluid in the cooling system 3. In one embodiment, the temperature sensor 25 comprises a relatively long probe 115 having a temperature gauge 117 with a digital or analog display at one end of the probe. In the embodiment of FIG. 6A, the third (temperature sensor) port 101 and outlet passage 79 of the valve body 21 are in alignment so that the probe 115 of the sensor can be inserted into the port 101, through the third passage 103 and aligned outlet passage 79, into and through the cooling system adapter 5, and thence into the cooling system 3 for sensing the temperature of the fluid therein. Other types of temperature sensors may be used, and in some embodiments, the temperature sensor can be eliminated entirely.

A sealing assembly, generally indicated at 121, is provided for sealing the third port 101. As viewed in FIGS. 6 and 6A this assembly comprises a check valve 125 seated in a counter bore 127 in the valve body passage 103, a seal housing 131 received in a cylindrical boss 135 projecting up from the valve body around the passage 103, an O-ring seal 141 adapted to be received in an annular recess 145 in the upper surface of the seal housing, and a compression cap 151 threaded on the boss 135. The cap 151 has a top wall 153, a central opening 155 in the top wall, and peripheral lip 157 depending from the top wall around the opening. The lip 157 is sized and configured for reception in the annular recess 145 of the seal housing 131 to compress the O-ring seal 141 when the cap 151 is threaded down on the boss 135. When compressed, the O-ring seal 141 is adapted to expand inward in a radial direction against the temperature probe 115 or plug 35, as the case may be, to form a fluid and pressure-tight seal. The seal is released by threading the cap 151 up on the hose 135 to allow the O-ring 141 to return to its uncompressed state. The cap 151 and seal housing 131 are made of a suitable material such as brass.

In one embodiment, the check valve 125 is a duckbill valve having opposing sealing flaps 161 of resilient material. The flaps 161 are biased toward a normally closed position in which they seal against leakage from the port 101, but they are adapted to open to permit the temperature probe 115 or plug 35, as the case may be, to be inserted into the port 101 to a position past the check valve 125. When the sealing flaps 161 are open, and the cap 151 has been tightened to compress the O-ring 141, the O-ring provides fluid and a pressure-tight seal to prevent leakage. Other sealing assemblies may be used to provide a suitable seal.

The first and second ports 71, 73 may be equipped with quick-connect couplings designated 171 and 173, respectively, for quick connection and disconnection of the first port 71 to a source of pressure (either positive or negative) and for quick connection and disconnection of the second port 73 to the pressure sensor 27. The quick-connect couplings may be of conventional design and have sealing components (not shown) to seal against leakage when the connections being made by the couplings are broken. The outlet 77 is also preferably provided with a similar self-sealing quick-connect coupling 177 for quick connection and disconnection of the outlet 77 to the inlet 9 of the cooling system adapter 5 or, if possible, directly to the cooling system.

As noted previously, the first port 71 is adapted for releasable connection either to a source of positive pressure or to a source of negative pressure (vacuum), depending on the type of test to be conducted. As shown in FIG. 2, the source of positive pressure may be the pressure pump 41, e.g., a conventional cylinder-and-plunger pump operable by hand, or some other source such as shop air which may require the use of the shop-air system adapter 45. Optionally, this shop-air adapter 45 may include a pressure regulation feature for reducing the pressure from a relatively high pressure (e.g., 60 psig or more) to a lower pressure (e.g., 15 psig) more suitable for pressure testing the cooling system. In one embodiment (FIG. 2), this pressure regulator feature comprises an adjustable pressure regulator 177, a quick-connect coupling 179 adapted for quick connection of the high-pressure side of the regulator to a shop-air system, an on-off valve (not shown) for controlling the supply of shop air to the regulator 177, and a quick-connect coupling 183 adapted for quick connection of the low-pressure side of the regulator to the first port 71 of the valve body 21, either directly or by means of the extension hose 55. A relief valve 185 may be provided for venting the low-pressure side of the regulator in the event the pressure at that location exceeds a predetermined pressure.

The source of negative pressure (vacuum) may be the venturi device 51 illustrated in FIG. 2. This device has a pressurized air port 187 which connects to a high pressure source, such as shop air, for example, and an outlet 191 which is adapted for quick connection to the first port 171 of the valve body 21, either directly or by means of the extension hose 55. Alternatively, the source of negative pressure (vacuum) may be a vacuum pump or other device capable of generating a negative pressure.

Figure 18:
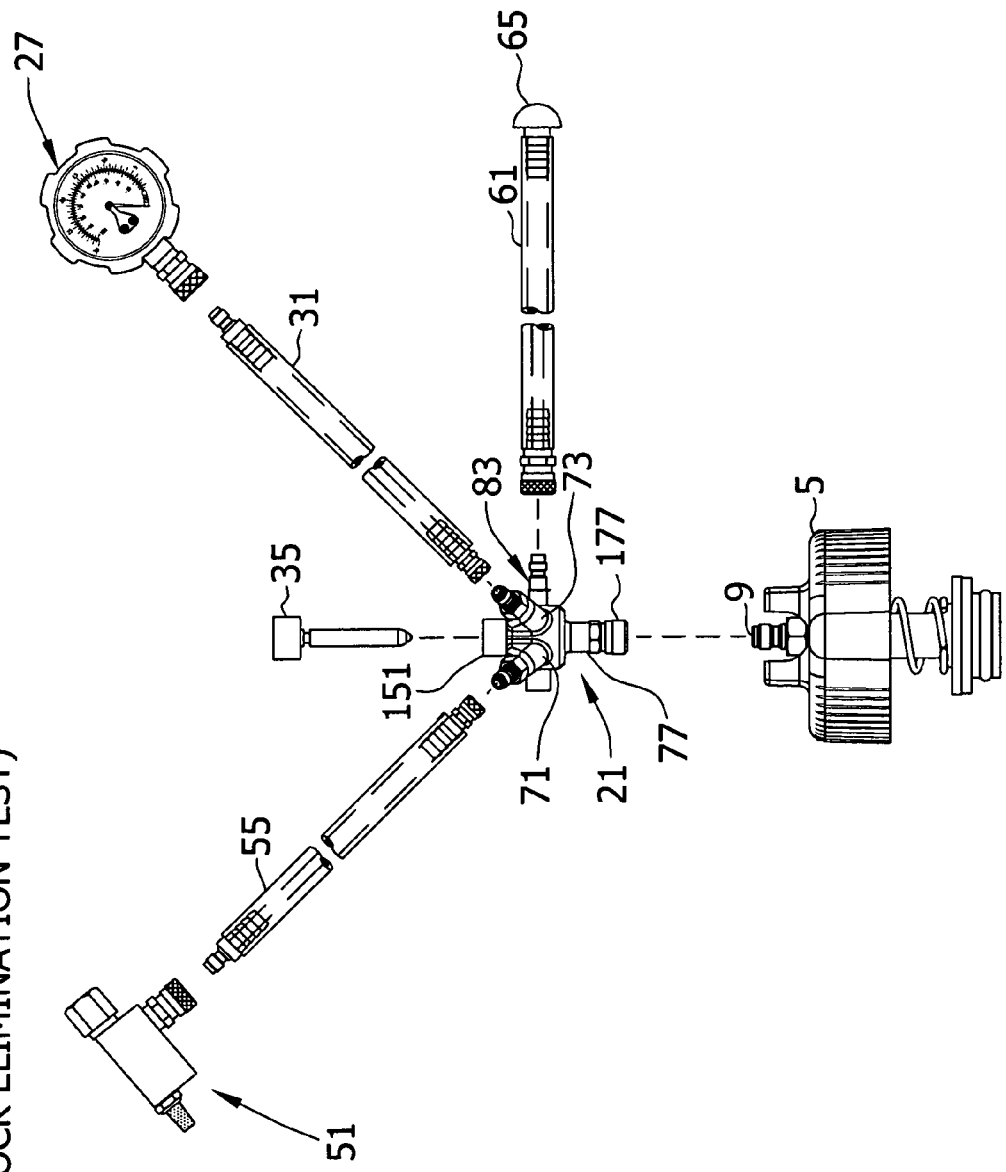
FIG. 18 is a view illustrating apparatus of this invention for conducting a system fill/airlock elimination test.

In the embodiment of FIGS. 8-10A, the valve member 83 comprises a spool valve, slidable in the valve passage 81 between its first (FIG. 10) and second (FIG. 10A) positions. The spool valve 83 has a longitudinal axis A1 extending in the direction of movement of the valve member. The flow passage 87 in the valve member comprises an axial bore extending axially of the spool valve. The axial bore 87 has an open end 195 and a closed end 197. An enlarged head 201 on the spool valve 83 adjacent the closed end 197 of the bore 87 functions as a stop which contacts the valve body 21 when the spool valve is in its open (FIG. 10) position. The spool valve 83 has a generally radial bore 205 which intersects the axial bore 87. When the spool valve is in its stated open position, the axial and radial bores 87, 205 communicate with the outlet passage 79 in the valve body via the opening 91 (FIG. 6A), thus allowing fluid (air and/or liquid) to flow to and from the cooling system 3 by way of the axial bore 87, radial bore 205, opening 91, and outlet passage 79. As a result, the spool valve 83 can be used to vent the cooling system 3 when it is at non-ambient pressure. This "venting" may be either from a positive pressure to a reduced (e.g., atmospheric) pressure or from a negative pressure (vacuum) to an increased (e.g., atmospheric) pressure depending on whether the pressure testing apparatus 1 is being used in a positive pressure test mode or a negative pressure test mode. In its open position the spool valve 83 can also be used to refill the cooling system 3 with coolant (FIG. 18A), as will be described later. O-ring seals 209 received in external circumferential grooves 211 in the spool valve provide the necessary sealing between the spool valve 83 and the valve body 21 to prevent undesired leakage. Preferably, the spool valve 83 also has a circumferential groove 213 at the location of the radial bore 205 to provide increased flow area for flow between the flow passage 87 in the spool valve and the outlet passage 79 of the valve body 21. The spool valve 83 may have other configurations without departing from the scope of this invention. The spool valve is made of a suitable material (e.g., brass).

Figure 8:
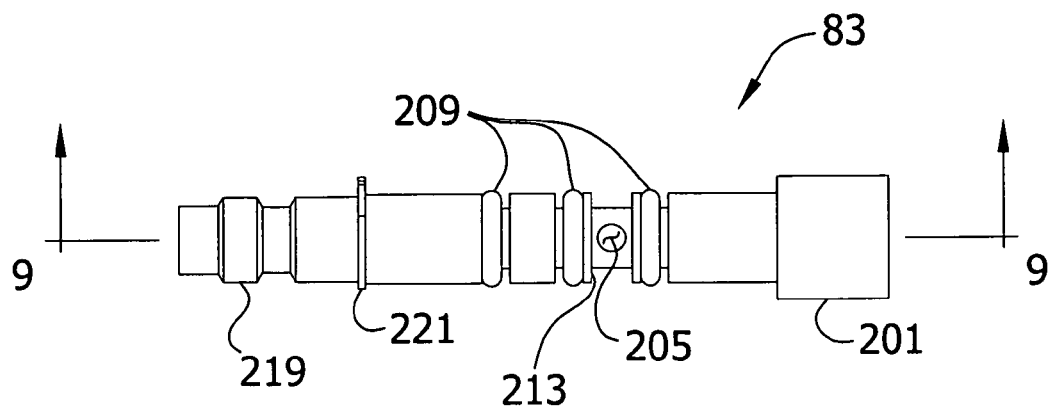
FIG. 8 is an enlarged elevation of a valve member (e.g., spool valve) of the valve body.
Figure 9:
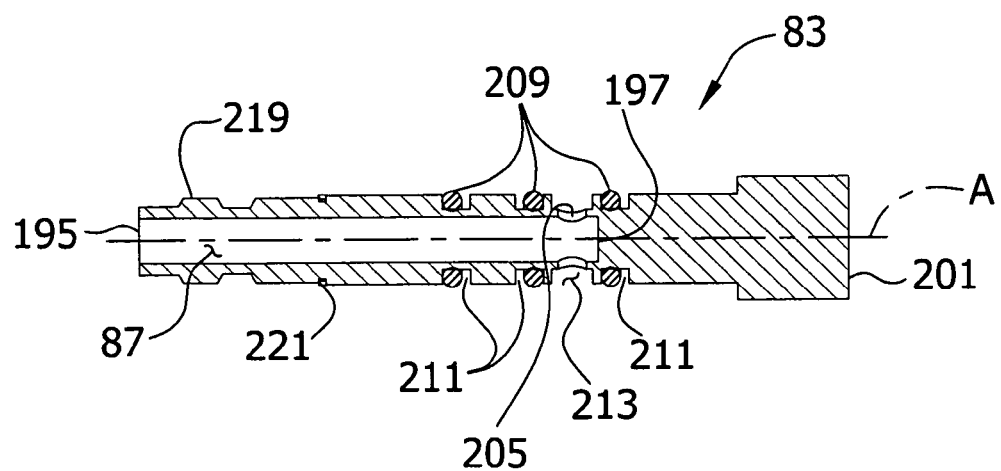
FIG. 9 is a sectional view taken on line 9-9 of FIG. 8.
Figure 10:
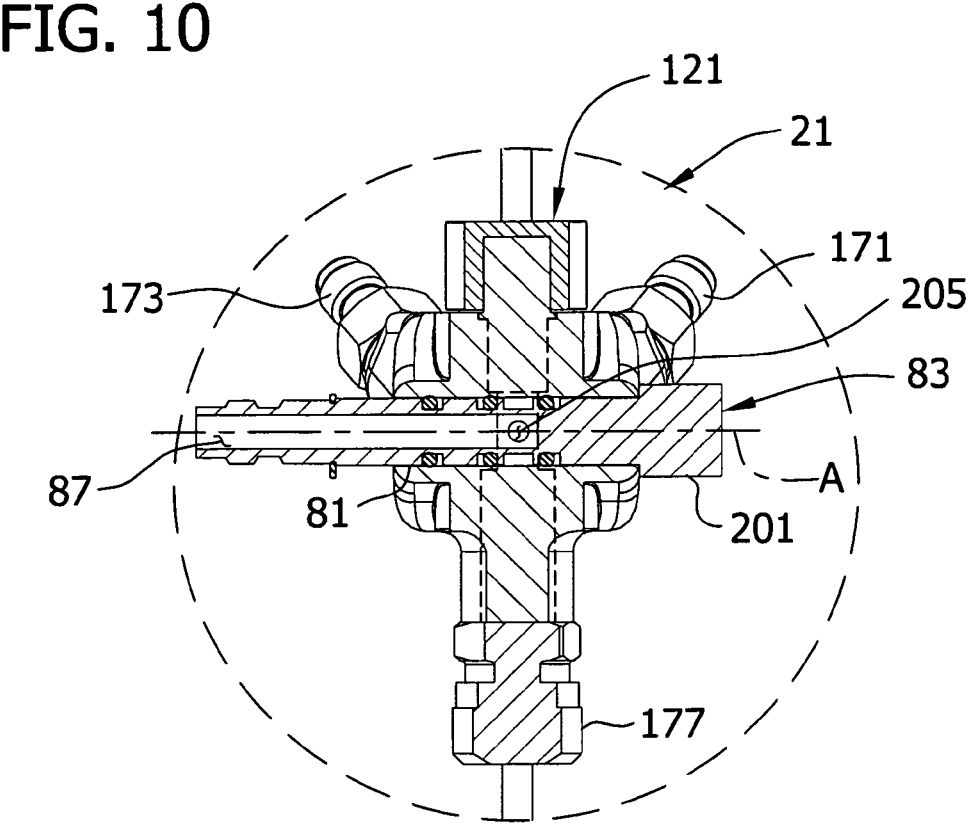
FIG. 10 is a sectional view taken on line 10-10 of FIG. 3 showing the valve member in an open position.
Figure 10A:
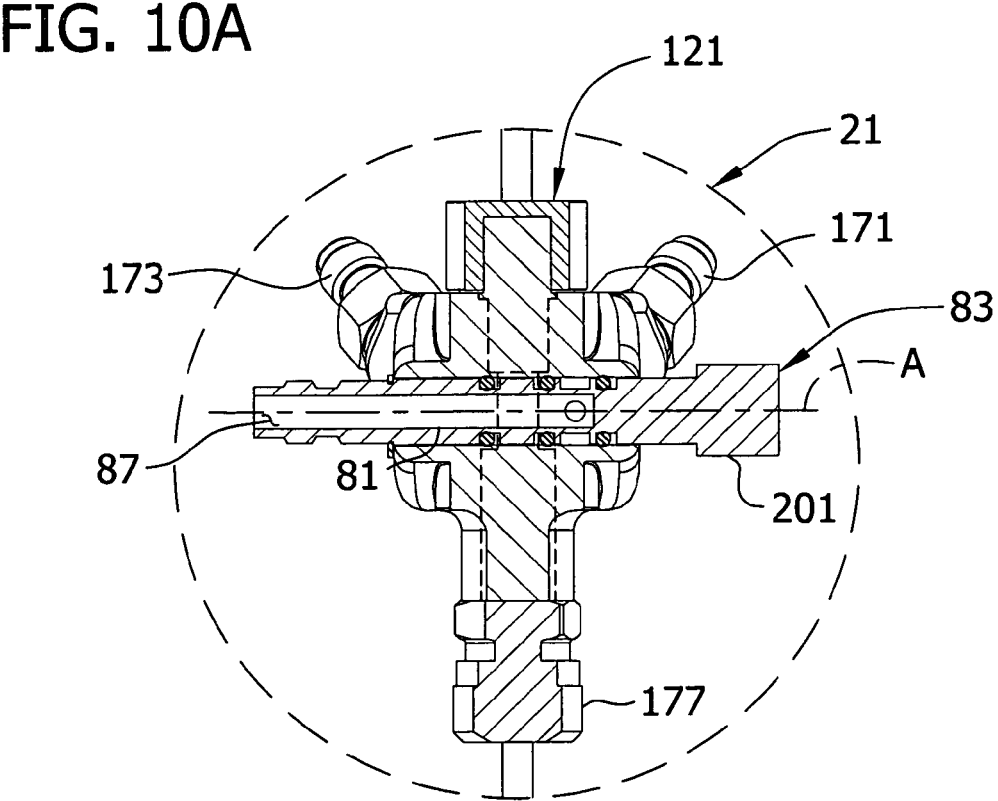
FIG. 10A is a view similar to FIG. 10 showing the valve member in a closed position.
Figure 11:
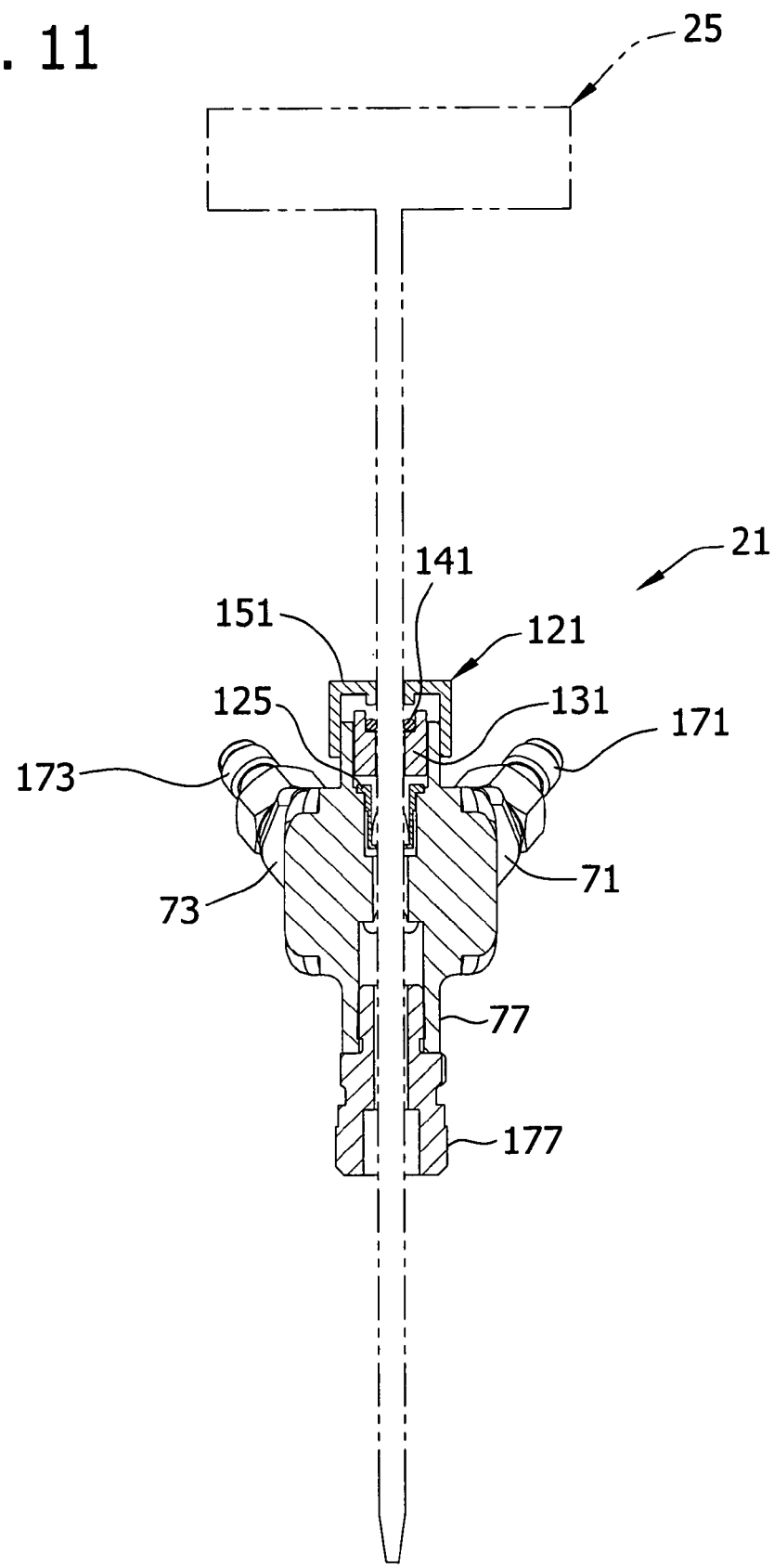
FIG. 11 is a sectional view taken on line 11-11 of FIG. 3 showing the sealing assembly in a loosened condition to permit insertion of a temperature probe (shown in phantom) into a port in the valve member.
Figure 11A:
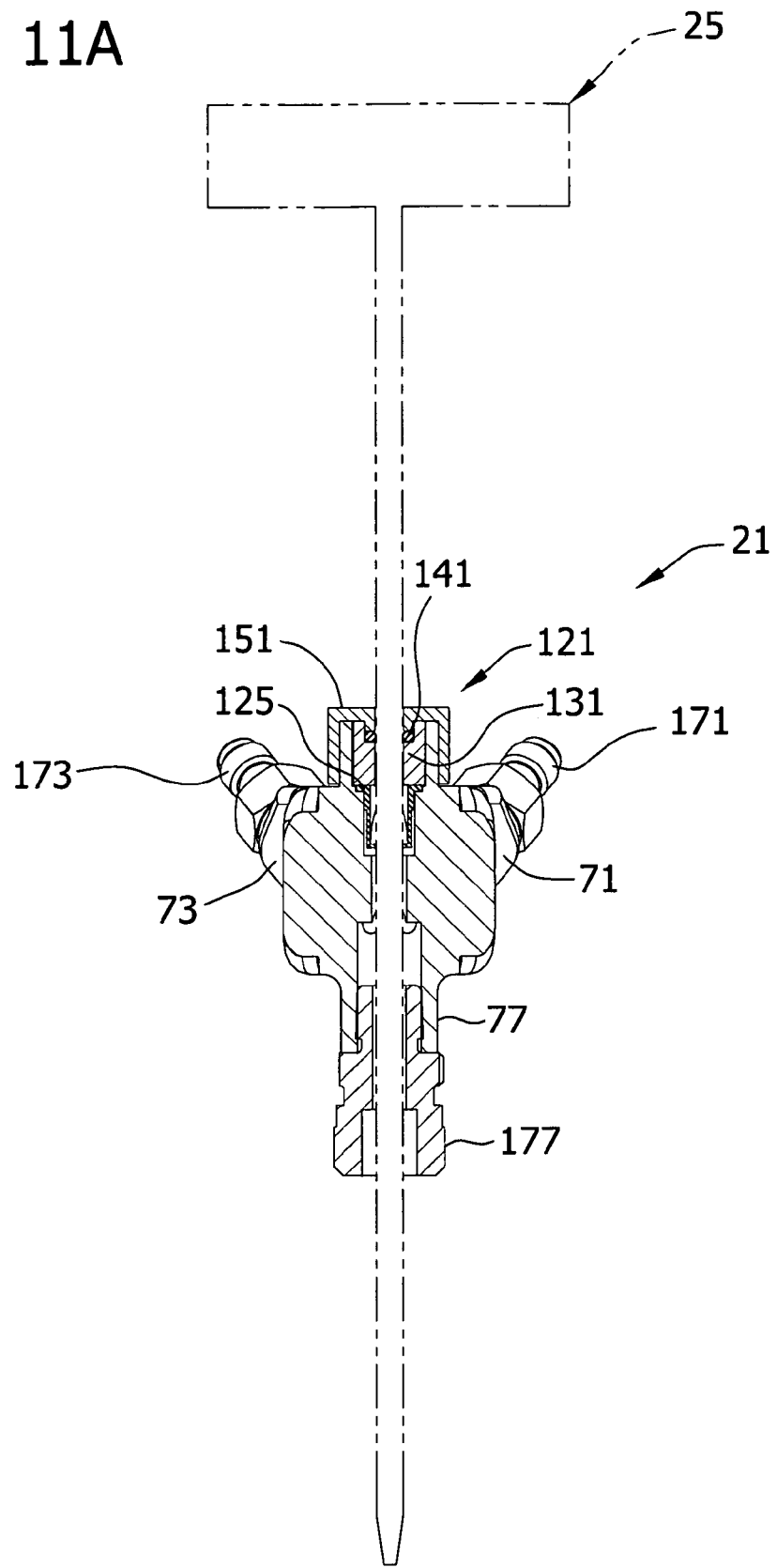
FIG. 11A is a view similar to FIG. 11 but showing the sealing assembly tightened to form a seal around the temperature probe.
Figure 12:
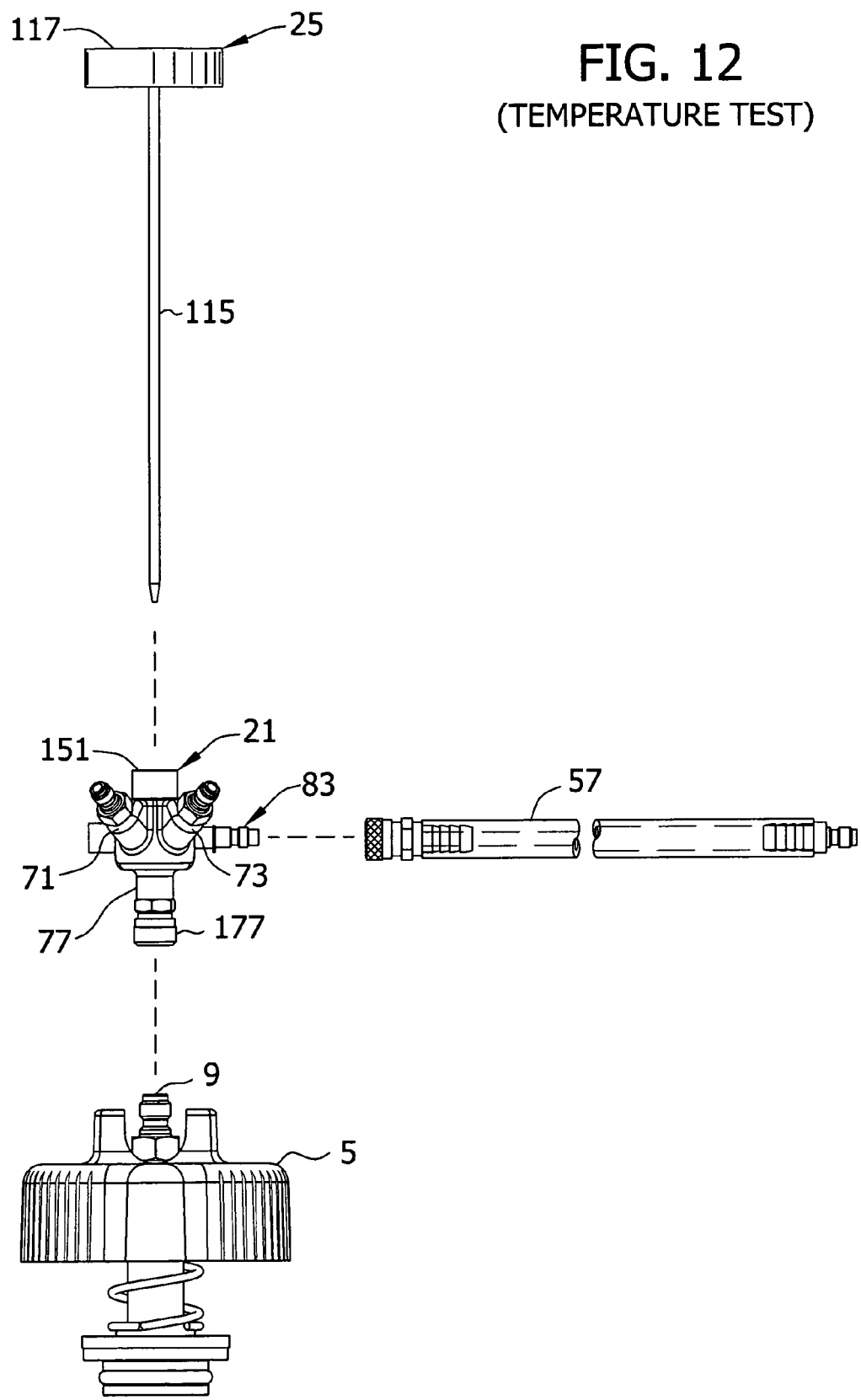
FIG. 12 is a view illustrating apparatus of this invention for conducting a temperature test.
Figure 13A:
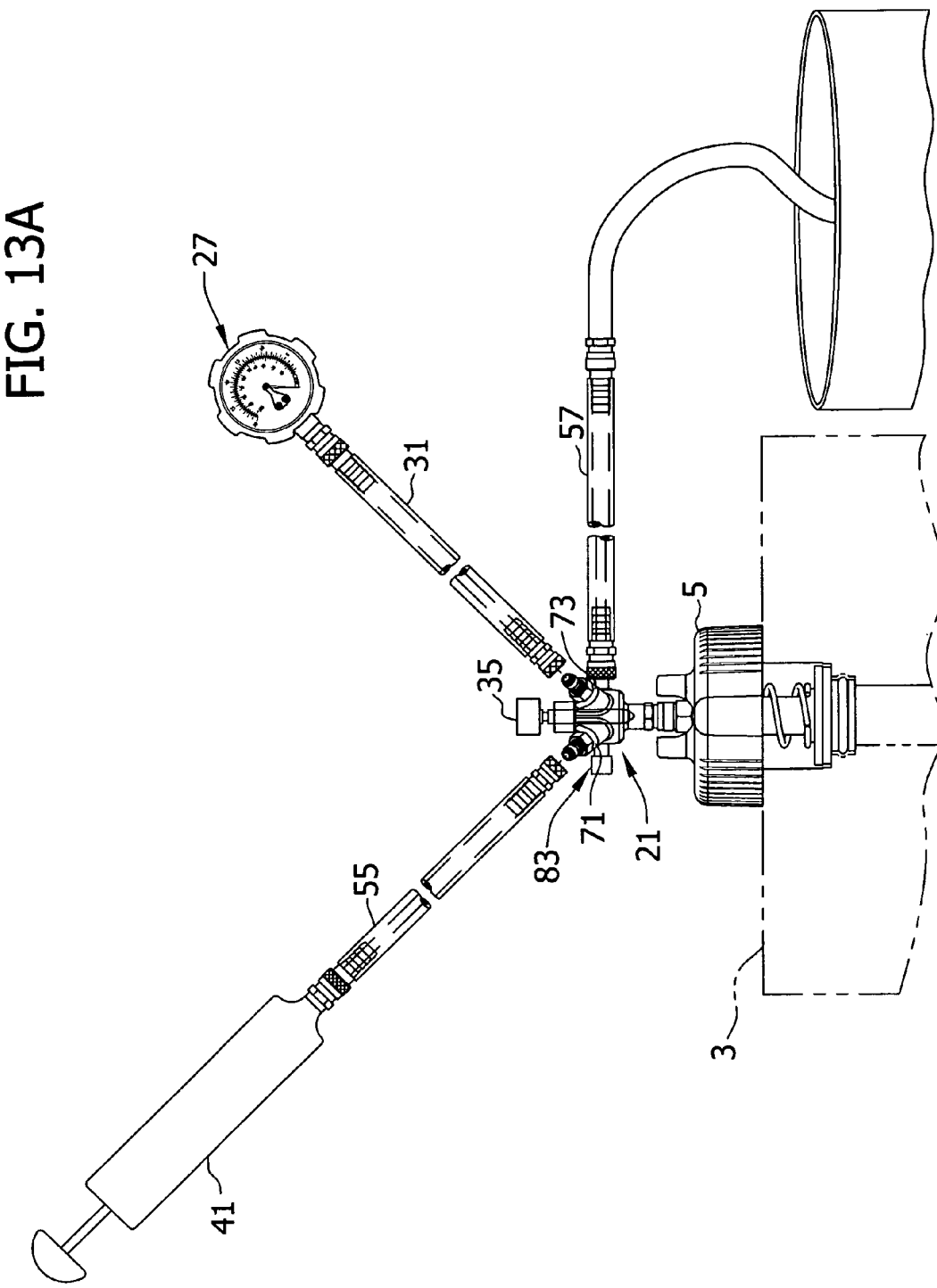
FIG. 13A is a view similar to FIG. 13 showing one embodiment of a pressure relief step of the static pressure test.
Figure 14:
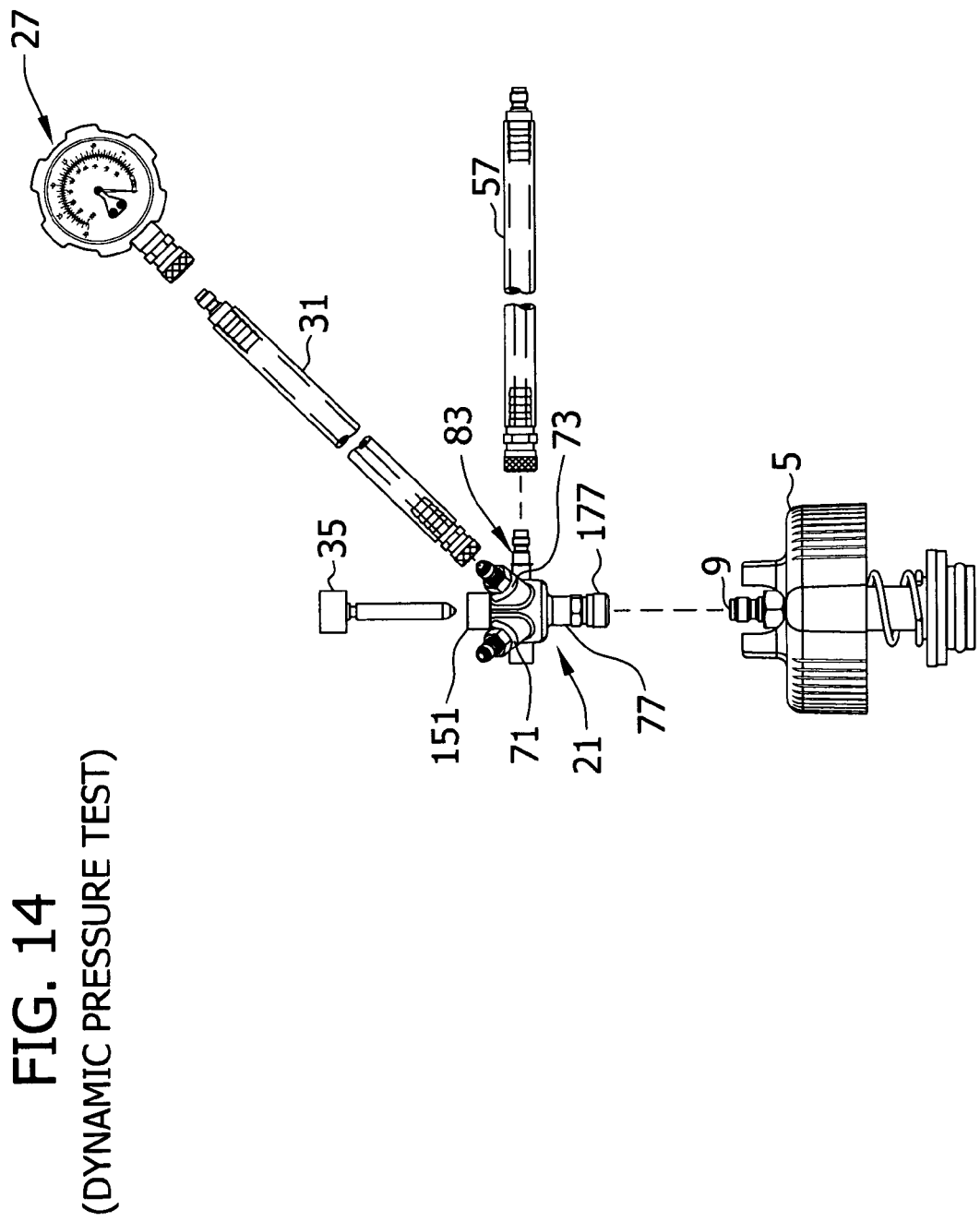
FIG. 14 is a view illustrating apparatus of this invention for conducting a dynamic pressure test.
Figure 15:
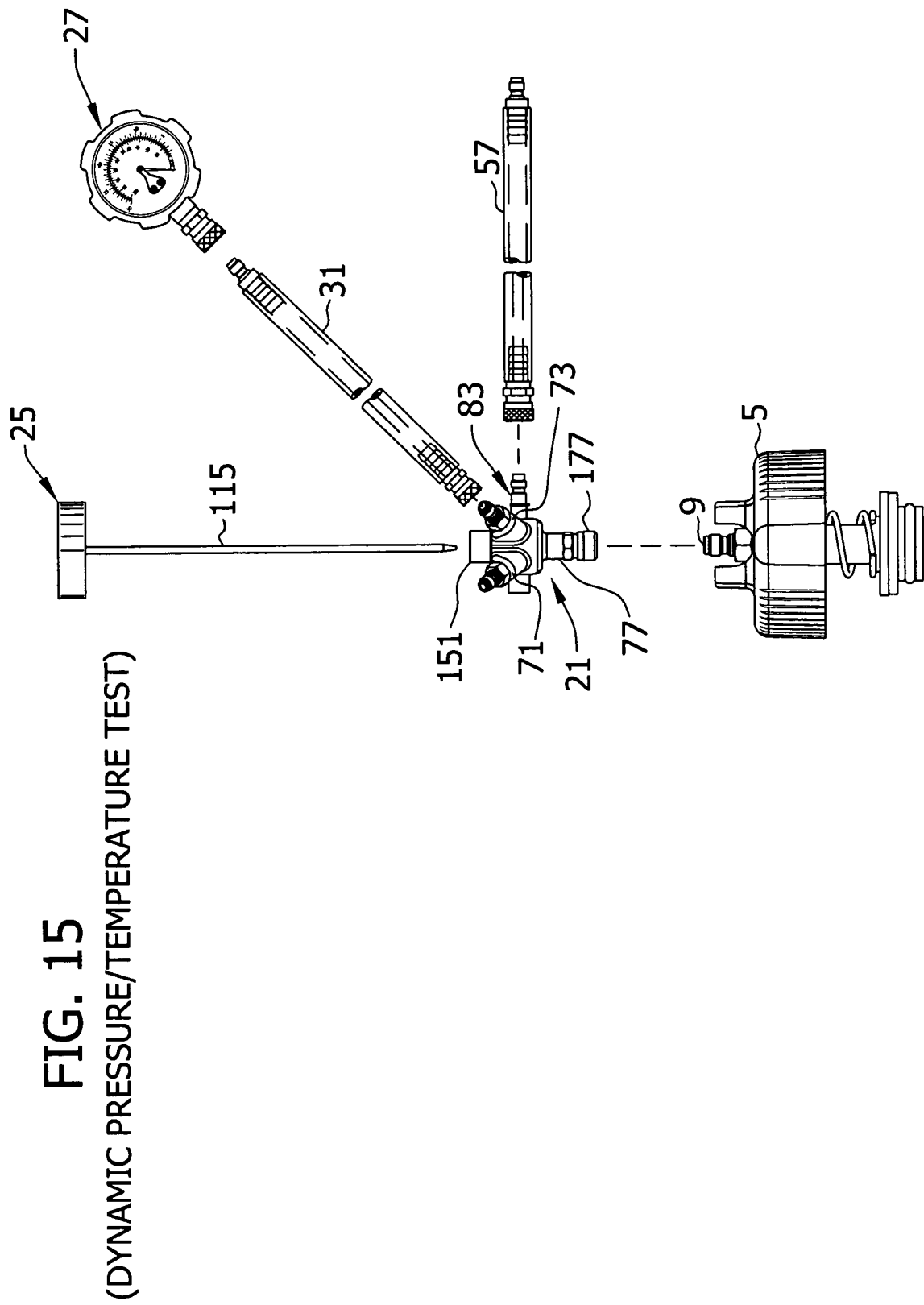
FIG. 15 is a view illustrating apparatus of this invention for conducting a dynamic pressure/temperature test.
Figure 16:
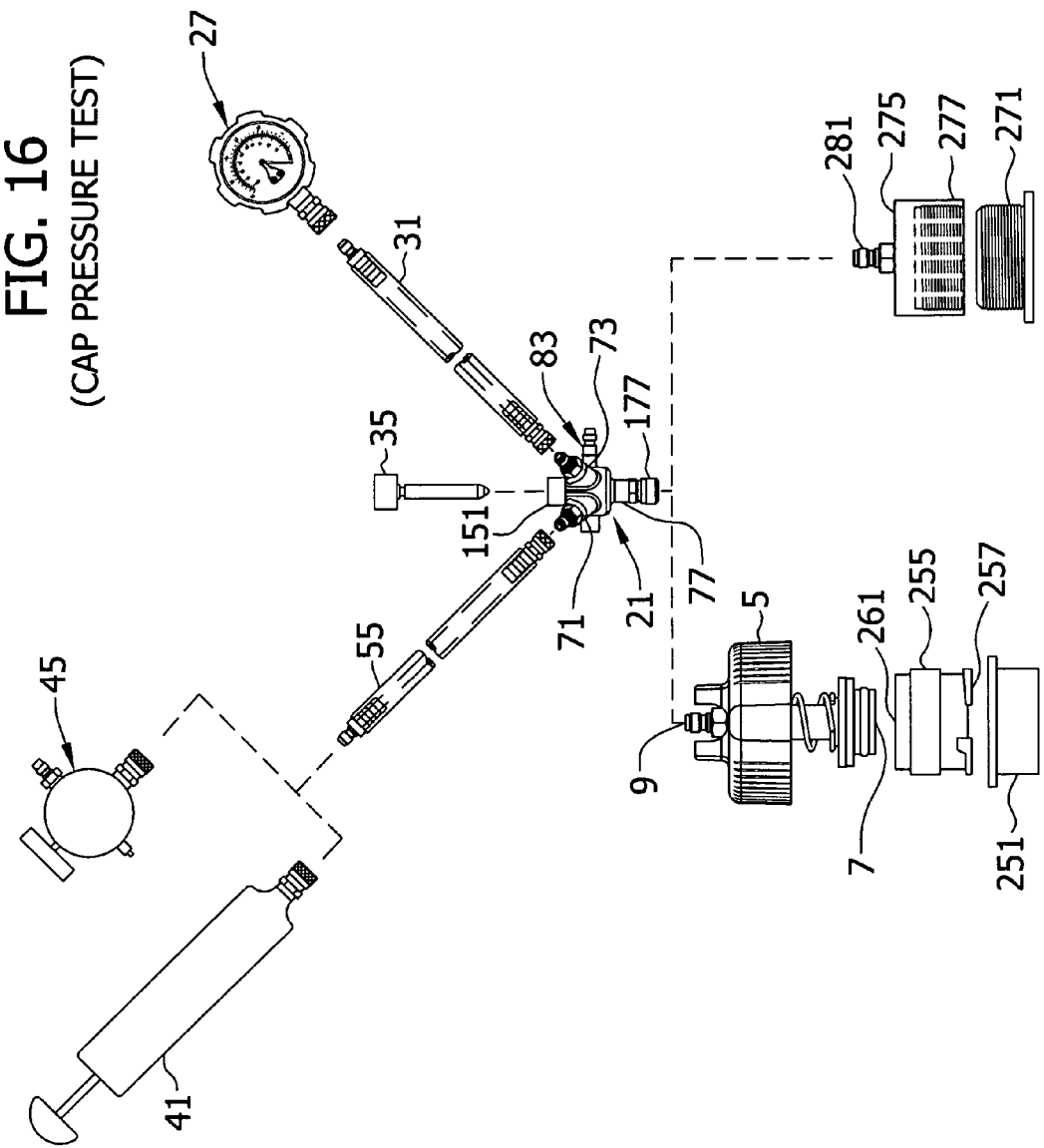
FIG. 16 is a view illustrating apparatus of this invention for conducting a cap pressure test.
Figure 17:
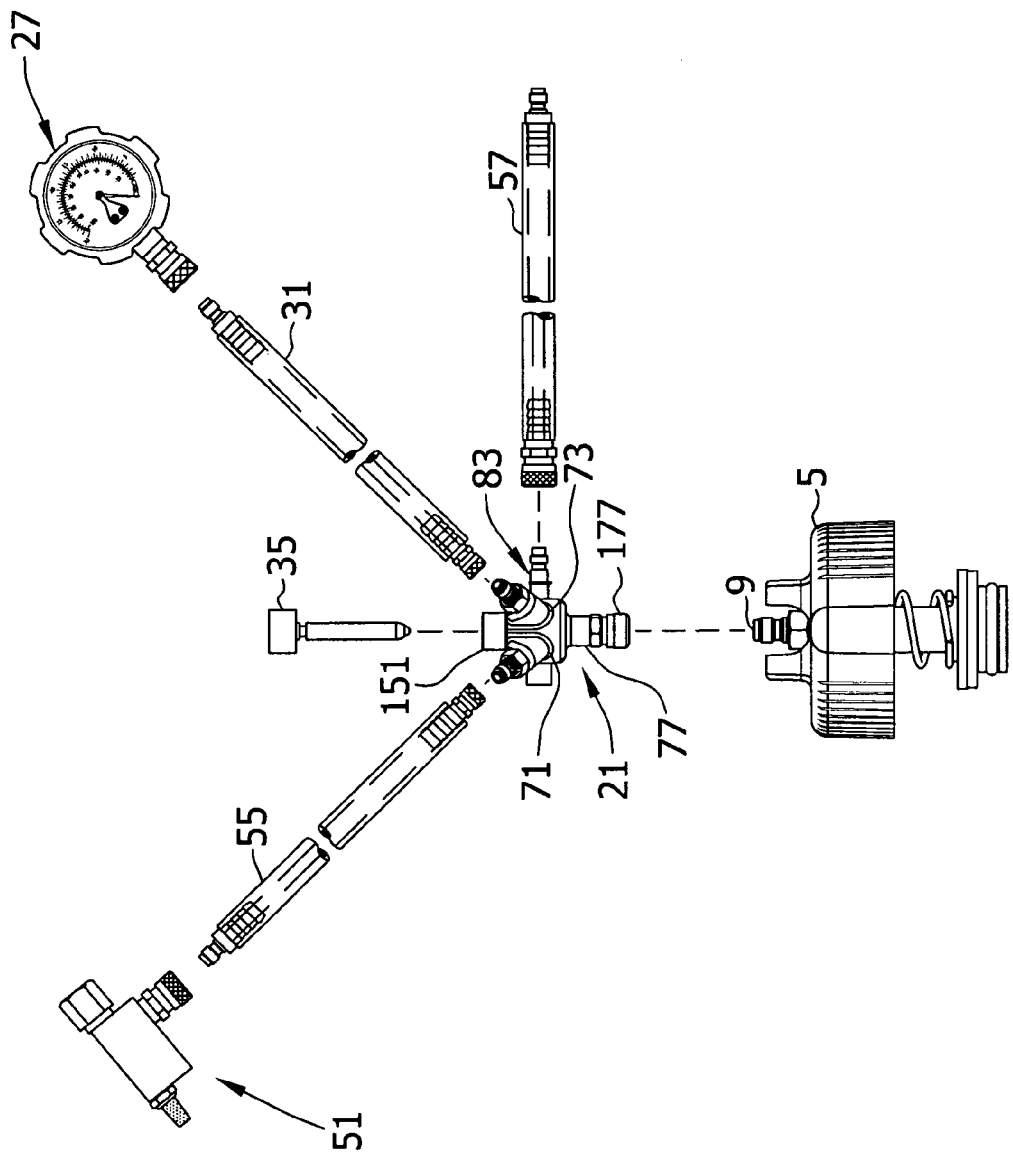
FIG. 17 is a view illustrating apparatus of this invention for conducting a vacuum test.

As best illustrated in FIGS. 8 and 9, the valve member 83 may be configured to have a quick-connect formation 219 adjacent its open end 195 for quick connection of the valve member to a fluid flow line, e.g., extension hose 57 with quick-connect fitting 59 or extension hose 61 with quick-connect fitting 63 (FIG. 2).

In general, the spool valve 83 is movable in the valve passage 87 between the stated open (FIG. 10) and closed (FIG. 10A) positions. In the closed position of the spool valve, in which the stop end 201 of the spool valve is spaced away from the body 21, the radial bore 205 is blocked by the valve body 21 such that the axial bore 87 in the spool valve 83 is not in fluid communication with the outlet passage 79 of the valve body. In this position, the cooling system 3 can be selectively pressurized or de-pressurized to test for leaks in the system. In the open position of the spool valve 83, in which the stop end 201 of the valve abuts the valve body 21, the radial bore 205 communicates with the outlet passage 79, thereby establishing a fluid flow path between the cooling system 3 and atmosphere to vent or refill the cooling system 3 (via the cooling system adapter 5, outlet passage 79, opening 91, radial bore 205, and axial bore 87). Movement of the spool valve 83 from its closed position (FIG. 10A) to its open (FIG. 10) position is limited by the enlarged head 201 on the spool valve. Movement of the spool valve 83 from its open position (FIG. 10) to its closed (FIG. 10A) position is limited by a retaining ring 221 on the spool valve 83 engageable with the valve body 21. Other means for controlling the movement between open and closed positions can be used.

As noted above, the testing apparatus of this invention may be used to conduct a variety of different tests. Some of these tests are shown schematically in FIGS. 12-18. These tests may be generally described as follows:

Temperature test (FIG. 12): A temperature test utilizes a temperature sensor (e.g., sensor 25) to monitor coolant temperature while the vehicle is operating. It is used to determine proper function of the thermostat and cooling fan switch, for example.

Static pressure test (FIG. 13): A static pressure test is used to duplicate the pressure produced in a coolant system under normal operating conditions, but without operating the vehicle. Pressure is monitored over a period of time to determine if the system contains any leaks, or if there is damage to the heads or engine block, for example.

Dynamic pressure test (FIG. 14): Damage to cylinder heads can be determined by monitoring system pressure and vacuum as the vehicle is operated.

Dynamic pressure/temperature test (FIG. 15): Monitoring pressure and temperature while a vehicle is operating can indicate a blown head gasket or cracked block, for example.

Cap pressure test (FIG. 16): A cap pressure test kit connects to a radiator or coolant bottle cap. It pressurizes and monitors the cap pressure to detect leaks.

Vacuum test (FIG. 17): The cooling system is drained, placed under negative pressure (vacuum), and then the pressure of the system is monitored for a period of time to determine if the system contains leaks.

System fill/airlock elimination process (FIG. 18): Air is evacuated from a cooling system using a vacuum. New fluid is then drawn into the cooling system, refilling it without trapping air.

The steps for conducting each of these procedures are described in detail below.

In one embodiment (FIG. 12), the temperature test is conducted by taking the following steps:

1. Install the appropriate cooling system adapter (e.g., 5) on the radiator or coolant bottle.
2. With the spool valve 83 in its closed position (FIG. 10A), connect the outlet 77 of the valve body 21 to the cooling system adapter 5 using the quick-connect coupling 177.
3. Loosen the cap 151 of the sealing assembly 121 to allow for insertion of the probe 115 of the temperature sensor 25.
4. Insert the probe 115 of the temperature sensor 25 into the third port 101, through the third passage 103 and outlet passage 79 of the valve body, through the cooling system adapter 5 and into the cooling system 3 so that the probe 115 contacts the coolant.
5. Tighten the cap 151 of the sealing assembly 121 to seal around the probe 115 to secure the temperature sensor 25 in place.
6. Start the vehicle. Watch the display 117 of the temperature sensor 25 and observe whether the thermostat opens at the correct temperature, and whether the electric fan turns on at the specified temperature.
7. Turn off the engine when the testing is complete.
8. Connect the extension hose 57 to the open end of the spool valve 83.
9. Place the free end of the extension hose 57 into the overflow bottle of the coolant system or a container capable of holding expelled heated coolant.
10. Move the spool valve 83 to its open (FIG. 10) position to bleed off the cooling system.
11. Once the pressure is completely relieved, remove the temperature sensor probe 115, hose 57, valve body 21, and cooling system adapter 5 from the radiator or coolant bottle.
12. Replace the radiator or coolant bottle cap.
13. Return after the engine is cool to top off the level of coolant in the radiator or coolant bottle.

In the above test, the first and second ports 71, 73 of the valve body 21 are not used. The internal valves in the quick-connect couplings 171, 173 on the valve body 21 seal the ports 71, 73 against leakage and hold pressure in the valve body 21.

In one embodiment (FIG. 13), the static pressure test is conducted by taking the following steps:

1. Install the appropriate cooling system adapter (e.g., 5) on the radiator or coolant bottle.
2. Connect the outlet 77 of the valve body 21 to the cooling system adapter 5 using the quick-connect coupling 177.
3. Move the spool valve 83 to its closed position (FIG. 10A).
4. With the plug 35 inserted in the third port 101, tighten the cap 151 of the sealing assembly 121 to seal around the plug 35 and secure it in place.
5. Connect the pressure sensor 27 to the second port 73 on the valve body 21, using the extension hose 31 if necessary.
6. Connect the appropriate source of high-pressure (e.g., hand pump 41 or shop-air adapter 45) to the first port 71 of the valve body 21, using the extension hose 55 if necessary.
7. Increase the air pressure until normal operating pressure is reached in the cooling system.
8. Check for coolant leaks by performing a visual inspection of the entire cooling system 3. Monitor the display on the pressure sensor 27 to determine if the cooling system 3 is maintaining pressure.
9. Carefully open the spool valve 83 and allow the excess pressure to be expelled.
10. Once the pressure is completely relieved, remove the pressure sensor 27, extension hose(s) 31, 55, 61, valve body 21, and cooling system adapter 5 from the radiator or coolant bottle.
11. Replace the radiator or coolant bottle cap.
12. Top off the level of coolant in the radiator or coolant bottle.

In one embodiment (FIG. 14), the dynamic pressure test is conducted by taking the following steps:

1. Install the appropriate cooling system adapter (e.g., 5) onto the radiator or coolant bottle.

2. Connect the outlet 77 of the valve body 21 to the cooling system adapter 5 using the quick-connect coupling 177.
3. Move the spool valve 83 to its closed position (FIG. 10A).
4. With the plug 35 inserted in the third port 101, tighten the cap 151 of the sealing assembly 121 to seal around the plug 35 and secure it in place.
5. Connect the pressure sensor 27 to the second port 73 on the valve body 21, using the extension hose 31 if required.
6. Start the engine.
7. While monitoring the pressure display on the pressure sensor 27, rapidly increase engine speed (e.g., by bumping the throttle) to 1000 to 2000 rpm for a short period of time. If the cooling system pressure rises above normal by approximately 10 psig, the engine may have a crack in the exhaust port or exhaust valve seat. If the pressure gauge reading fluctuates rapidly, a crack may exist between the intake and exhaust valve seats. If the pressure gauge indicates vacuum, the engine may have a crack in an intake port or intake valve seat.
8. Turn off the engine when testing is complete.
9. Connect the extension hose 57 to the open end 195 of the spool valve 83.
10. Place the free end of the extension hose 57 into the overflow bottle or a container capable of holding expelled coolant.
11. Move the spool valve 83 to its open position (FIG. 10) to bleed off the cooling system 3.
12. Once the pressure is completely relieved, remove the pressure sensor 27, extension hose(s) 31, 57, valve body 21, and cooling system adapter 5 from the radiator or coolant bottle.
13. Replace the radiator or coolant bottle cap.
14. Return after the engine is cool to top off the level of coolant in the radiator or coolant bottle.

In the above test, the first port 71 of the valve body 21 is not used. The internal valve in the quick-connect coupling 171 on the valve body 21 will seal the port 71 against leakage and hold the pressure in the valve body 21.

In one embodiment (FIG. 15), the dynamic pressure/temperature test is conducted by taking the following steps:
1. Install the appropriate cooling system adapter (e.g., 5) on the radiator or coolant bottle.
2. With the spool valve 83 in its closed position (FIG. 10A), connect the outlet 77 of the valve body 21 to the cooling system adapter 5 using the quick-connect coupling 177.
3. Loosen the cap 151 of the sealing assembly 121 to allow for insertion of the probe 115 of the temperature sensor 25.
4. Insert the probe 115 of the temperature sensor 25 into the third port 101, through the third passage 103 and outlet passage 79 of the valve body 21, through the cooling system adapter 5 and into the cooling system 3 so that the probe 115 contacts the coolant.
5. Tighten the cap 151 of the sealing assembly 121 to seal around the probe 115 and secure the temperature sensor 25 in place.
6. Connect the pressure sensor to 27 the second port 73 of the valve body 21, using the extension hose 31 if necessary.
7. Start the vehicle. Monitor both the temperature and pressure readings simultaneously.
8. If the system pressure rises rapidly and/or the fluid temperature is above normal, cylinder pressure may be leaking into the cooling system 3. Other indications of this include overheating or continual release of coolant from the cooling system vent.
9. As the pressure rises, also check for steam at the tailpipe, as this may indicate a problem with the head gasket(s) or engine block.
10. Turn off the engine when testing is complete.
11. Connect the extension hose 57 to the open end 195 of the spool valve 83.
12. Place the free end of the extension hose 57 into the overflow bottle or a container capable of holding expelled coolant.
13. Move the spool valve 83 to its open position (FIG. 10) to bleed off the cooling system 3.
14. Once the pressure is completely relieved, remove the temperature sensor probe 115, extension hose(s) 31, 57, valve body 21, and cooling system adapter 5 from the radiator or coolant bottle.
15. Replace the radiator 201 or coolant bottle cap.
16. Return after the engine is cool to top off the level of coolant in the radiator or coolant bottle.

In the above test, the first port 71 of the valve body 21 is not used. The internal valve in the quick-connect coupling 171 on the valve body 21 will seal the port 71 against leakage and hold the pressure in the valve body 21.

In one embodiment (FIG. 16), the cap pressure test is conducted by taking the following steps:
1. If the cap to be tested is a bayonet-style cap for a radiator, such as the cap 251 shown in FIG. 16, attach the cap 251 to an appropriate cap adapter 255 having a bayonet-receptive outlet end 257 configured for a releasable sealing connection to the cap 251, and an inlet end 261 configured for a releasable sealing connection to the outlet end of the system adapter 5. If the cap to be tested is a threaded-style cap for a threaded coolant bottle, such as the cap 271 shown in FIG. 16, attach the cap 271 to an appropriate cap adapter 275 having an outlet end 277 configured for a releasable sealing threaded connection with the cap 271, and an inlet end 281 configured for a releasable sealing connection to the outlet 77 of the body valve 21. (In this case, the system adaptor 5 is not used.)
2. With the plug 35 inserted in the third port 101, tighten the cap 151 of the sealing assembly 121 on the valve body 21 to seal around the plug 35 and secure it in place.
3. Move the spool valve 83 of the valve body 21 to its closed position (FIG. 10A).
4. If the radiator cap 251 is being tested, connect the outlet 77 of the valve body 21 to the inlet end 9 of the appropriate system adapter 5 using the quick-connect coupling 177. Then connect the outlet end 207 of the system adapter 5 to the inlet end 261 of the cap adapter 255. If the cooling bottle cap 271 is being tested, connect the outlet 77 of the valve body 21 directly to the inlet end 281 of the cap adapter 275.
5. Connect the pressure sensor 27 to the second port 73 on the valve body 21, using the extension hose 31 if necessary.
6. Connect the source of positive-pressure air (e.g., hand pump 45 or shop-air adapter 45) to the first port 71 on the valve body 21.
7. Increase the air pressure until the cap 251, 271 releases pressure. Compare the release pressure to the acceptable range of the cap 251, 271.
8. Increase the pressure again to a level below the release point.
9. Monitor the display of the pressure sensor 27 to determine if the cap 251, 271 maintains pressure.

10. Disconnect the source of positive-pressure air to relieve residual pressure.
11. Remove the pressure sensor 27, extension hose(s) 31, 55, valve body 21, system adapter 5 (if necessary), and cap adapter 255, 275 from the cap 251, 271 of the radiator or coolant bottle.

In one embodiment (FIG. 17), the vacuum test is conducted by taking the following steps:
1. Completely drain the cooling system 3 of all coolant.
2. Install the appropriate cooling system adapter 5 onto the radiator or coolant bottle.
3. With the plug 35 inserted in the third port 101, tighten the cap 151 of the sealing assembly 121 to seal around the plug 35 and secure it in place.
4. With the spool valve 21 in its closed position (FIG. 10A), connect the outlet 77 of the valve body 21 to the cooling system adapter 5 using the quick-connect coupling 177.
5. Connect the pressure sensor 27 to the second port 73 on the valve body 21, using the extension hose 31 if needed.
6. Connect high pressure air (e.g., shop air) to the venturi device 51 or other source of negative pressure (vacuum).
7. Connect the venturi device 51 to the first port 71 of the valve body 21, using the extension hose 55 if necessary.
8. Turn on the shop-air supply.
9. While watching the display of the pressure sensor 27, allow the venturi device 51 to pull air from the cooling system 3 until it reaches a suitable negative (vacuum) test pressure (e.g., 24 to 26 in. Hg).
10. Turn off the high pressure air and disconnect the venturi device 51 and extension hose 55 (if used) from the valve body 21.
11. Continue to monitor the display of the pressure sensor 27 to determine if the cooling system 3 is maintaining vacuum.
12. Depending on the leak test results, the vacuum in the evacuated cooling system 3 may be used to refill it with coolant. (See the system fill/airlock elimination process described below.) Otherwise, open the spool valve 83 to eliminate the vacuum.
13. Remove the test kit components, and service and refill the cooling system 3 as required.

In one embodiment (FIG. 18), the system fill/airlock elimination process is carried out by taking the following steps:
1. Follow steps 1-10 in the vacuum test (FIG. 17) described above to evacuate the cooling system 3.
2. With the spool valve 83 in its closed (FIG. 10A) position, connect the refill hose 61 to the open end 195 of the spool valve 83.
3. Place the free filtered end of the refill hose 61 in a supply of coolant (see FIG. 18A).
4. Move the spool valve 83 to its open position (FIG. 10).
5. When the display of the pressure sensor 27 reads zero (0), disconnect all tester components from the cooling system 3.
6. Start the engine and allow it to reach operating temperature.
7. Top-off the coolant level in the radiator or coolant bottle, as required, and reinstall the radiator or coolant bottle cap.

Thus, as will be observed from the foregoing, various procedures can be conducted using the components of this invention. In general, if a particular procedure involves pressurizing the cooling system 3 to a positive pressure, as in the static pressure test (FIG. 13), the spool valve 83 is moved to its closed position (FIG. 10A), and the first port 71 of the valve body 21 is connected to a source of positive pressure to establish a flow path from the source to the cooling system 3 (via the first port 71, first passage 93, outlet passage 79 and cooling system adapter 5) to pressurize the cooling system to a predetermined pressure. After the system is pressurized to a suitable pressure greater than ambient or atmospheric pressure (e.g., 15 psig), as monitored by using the pressure gauge 27, further pressurization is stopped, either by stopping further pumping of the hand pump 41 or, if shop air 45 is used, by shutting off the supply of air to the first port 71 of the valve body 21. The pressure gauge 27 is then monitored to watch for a decrease in pressure indicating one or more leaks. After the repair is complete, the spool valve 83 is moved to its open (FIG. 10) position to establish a flow path between the cooling system 3 and atmospheric conditions, thereby allowing the cooling system to vent through the open end 85 of the flow passage. Alternatively, the system can be vented before or during the repair process. A vent line (e.g., extension hose 57) may be connected to the open end of the vent passage for directing any escaping fluids to an appropriate location, such a waste receptacle (e.g., FIG. 13A). If the testing apparatus includes a third (temperature) port 101, the temperature sensor 25 can be used to monitor temperature conditions in the cooling system 3 before, during or after any stage of the testing process.

If the test involves pressurization of the cooling system 3 to a negative pressure (vacuum), as during the vacuum test (FIG. 17) procedure described above, essentially the same sequence of steps is used, except that the valve body 21 is connected to a source of negative pressure (vacuum) instead of positive pressure. After any leak has been detected and repaired, the spool valve 83 is moved to its open (FIG. 10) position to establish a flow path between the cooling system 3 and atmospheric conditions, thereby venting or releasing the negative pressure (vacuum) in the cooling system. Alternatively, the system can be vented before or during the repair process optionally, before the spool valve 83 is moved to its open (FIG. 10) position, a fluid flow line (e.g., extension hose 61 in FIG. 18A) communicating with a reservoir of cooling system fluid may be connected to the open end 195 of the flow passage 87. When the spool valve 83 is moved to its open (FIG. 10) position, the negative pressure (vacuum) in the cooling system 3 will cause cooling system fluid to be aspirated from the reservoir into the cooling system. The ability to fill the cooling system 3 using negative pressure avoids the formation of problematic air bubbles in the cooling system.

The apparatus and methods of this invention are easy to use and carry out. Further, the apparatus can be converted between positive and negative pressure modes of operation quickly and easily with only a minimal number of connections and disconnections. Further, the temperature of the cooling system 3 can be monitored without regard to which mode of operation is in use.

In the foregoing embodiments, the pressure sources (positive or negative) 41, 45, 51 are illustrated as being connected to the first port 71, and the pressure sensor 27 is shown as being connected to the second port 73. However, it will be understood that this configuration can be reversed, that is, the pressure sources can be connected to port 73 and the pressure sensor can be connected to port 71.

As used herein, the term "fluid" means a liquid or a gas, including air.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. Apparatus for testing a cooling system, comprising
a valve body adapted for releasable connection to said cooling system,
a first port on the valve body adapted for selective releasable connection to a source of positive pressure for pressurizing the cooling system and to a source of negative pressure for de-pressurizing the cooling system,
a second port on the valve body adapted for connection to a pressure sensor for monitoring the pressure of fluid in said cooling system,
an outlet on the valve body in fluid communication with said first and second ports and adapted for fluid communication with said cooling system when the valve body is connected to said cooling system,
a valve passage in the valve body,
a valve member movable in the valve passage between open and closed positions, and
a flow passage in the valve member such that when said valve member is in said open position the flow passage and said outlet are in fluid communication to permit fluid flow to or from the cooling system via the flow passage and said outlet, and when said valve member is said closed position the flow passage and said outlet are not in fluid communication to block said fluid flow.

2. Apparatus as set forth in claim 1 further comprising a quick-connect coupling at each of said first and second ports for quick connection and disconnection of said source and said pressure sensor, respectively, with respect to said valve body.

3. Apparatus as set forth in claim 1 further comprising a cooling system adapter for connecting said valve body to said cooling system, and a quick-connect coupling at said outlet of said valve body for quick connection to said cooling system adapter.

4. Apparatus as set forth in claim 1 wherein said valve member is a spool valve having a longitudinal axis extending in the direction of movement of the valve member, said flow passage comprising an axial bore extending axially of the spool valve and having an open end, and a generally radial bore intersecting said axial bore, said radial bore communicating with said outlet when said spool valve is in its said open position thereby to allow said fluid flow.

5. Apparatus as set forth in claim 1 further comprising a third port on the valve body for receiving a temperature sensor for sensing the temperature of fluid in said cooling system.

6. Apparatus as set forth in claim 5 wherein said third port is aligned with said outlet to permit insertion of a probe of said temperature sensor through said third port and said outlet into said cooling system.

7. Apparatus as set forth in claim 6 further comprising a sealing assembly on the valve body, said sealing assembly comprising a check valve movable between a closed position closing said third port and an open position permitting insertion of said probe past the check valve.

8. A method of testing a cooling system for fluid leakage, comprising the steps of:
connecting a valve body to a cooling system adapter on the cooling system;
connecting a source of non-ambient pressure to a first port on said valve body to establish a flow path through the valve body and said cooling system adapter to said cooling system thereby to pressurize or de-pressurize the cooling system to a non-ambient pressure;
connecting a pressure sensor to a pressure sensor port on the valve body;
monitoring the non-ambient pressure of the cooling system using the pressure sensor for pressure changes indicative of fluid leakage; and
while the valve body is connected to the cooling system adapter, moving a valve member in the valve body to an open position in which a flow passage in the valve member establishes a flow path through the cooling system adapter and valve body to atmosphere.

9. A method as set forth in claim 8 wherein said source of pressure is a source of positive pressure, and wherein moving the valve member to said open position vents the cooling system.

10. A method as set forth in claim 8 wherein said source of pressure is a source of negative pressure, and wherein said method further comprises connecting said valve member to a source of fluid for the cooling system whereby when the valve member is moved to said open position, fluid is aspirated into said cooling system.

11. Apparatus for testing a cooling system, comprising
a valve body adapted for releasable connection to said cooling system,
a pressure sensor port on the valve body for receiving a pressure sensor for monitoring the pressure of fluid in said cooling system,
an outlet on the valve body in fluid communication with said pressure sensor port and adapted for fluid communication with said cooling system when the valve body is connected to said cooling system,
a valve passage in the valve body,
a valve member movable in the valve passage between open and closed positions, and
a flow passage in the valve member such that when said valve member is in said open position the flow passage and said outlet are in fluid communication to permit fluid flow to or from the cooling system via the flow passage and said outlet, and when said valve member is said closed position the flow passage and said outlet are not in fluid communication to block said fluid flow.

12. Apparatus as set forth in claim 11 further comprising a temperature sensor port on the valve body for receiving a temperature sensor for sensing the temperature of fluid in said cooling system.

13. Apparatus as set forth in claim 12 wherein said temperature sensor port is aligned with said outlet to permit insertion of a probe of said temperature sensor through said third port and said outlet into said cooling system.

14. Apparatus as set forth in claim 13 further comprising a sealing assembly on the valve body, said sealing assembly comprising a check valve movable between a closed position closing said temperature sensor port and an open position permitting insertion of said probe past the check valve.

15. A method of conducting a temperature/pressure test on a cooling system of an engine, said method comprising the steps of:
connecting a valve body to a cooling system adapter on the cooling system;
inserting a temperature probe into a temperature probe port in the valve body, and moving the probe through the valve body and said cooling system adapter to a position in which the probe contacts coolant in the cooling system;

monitoring the temperature of the coolant while the engine is operating;

connecting a pressure sensor to a pressure sensor port on the valve body;

monitoring the pressure of the cooling system using the pressure sensor while the engine is operating; and moving a valve member in the valve body to an open position in which a flow passage in the valve member establishes a flow path through the cooling system adapter and valve body to atmosphere to relieve pressure in the cooling system.

16. A method as set forth in claim 15 further comprising stopping the engine before moving the valve member to said open position.

17. A method as set forth in claim 16 further comprising attaching a pressure relief hose to an open end of said valve member so that any fluid expelled from the cooling system when said pressure is relieved is drained through the hose.

* * * * *